(12) United States Patent
Orubor

(10) Patent No.: US 8,444,066 B2
(45) Date of Patent: May 21, 2013

(54) CHEMICAL DISPENSING APPARATUS

(76) Inventor: Lawrence Orubor, Calgary (CA)

( * ) Notice: Subject to any disclaimer, the term of this patent is extended or adjusted under 35 U.S.C. 154(b) by 203 days.

(21) Appl. No.: 13/101,262

(22) Filed: May 5, 2011

(65) Prior Publication Data

US 2011/0278372 A1 Nov. 17, 2011

Related U.S. Application Data

(60) Provisional application No. 61/333,280, filed on May 11, 2010.

(51) Int. Cl.
*A62C 5/02* (2006.01)

(52) U.S. Cl.
USPC .............................. 239/310; 239/344; 239/407

(58) Field of Classification Search
USPC ................. 239/310, 344, 354, 361, 398, 413, 239/407, 412, 569, 570
See application file for complete search history.

(56) References Cited

U.S. PATENT DOCUMENTS

| | | | | |
|---|---|---|---|---|
| 5,100,060 A | * | 3/1992 | Haferkorn | 239/337 |
| 5,119,992 A | * | 6/1992 | Grime | 239/364 |
| 5,213,265 A | * | 5/1993 | Englhard et al. | 239/310 |
| 5,695,125 A | * | 12/1997 | Kumar | 239/364 |
| 6,345,773 B1 | * | 2/2002 | Shanklin et al. | 239/318 |
| 2007/0138320 A1 | * | 6/2007 | Timmes et al. | 239/398 |

* cited by examiner

*Primary Examiner* — Davis Hwu
(74) *Attorney, Agent, or Firm* — Maxey Law Offices, PLLC; Stephen Lewellyn

(57) ABSTRACT

A chemical dispensing apparatus includes a housing that is connectable to a source of water, such as a standard garden house, and an internal space in which is disposed a rotatable container containing a quantity of chemical concentrate to be mixed with the source of water as it flows through the housing and is dispensed from the housing from a sprinkler head or misting nozzle. The flow of water through the housing powers a water turbine which is connected to the rotatable container, such that the container is rotated as water flows through the housing. In an alternative embodiment, the water turbine is replaced with an electric motor. Rotation of the container cause the chemical concentrate to dissolve which is then mixed with the water before it is dispensed through the sprinkler or mister.

34 Claims, 25 Drawing Sheets

CHEMICAL DISPENSING APPARATUS

CROSS-REFERENCE TO RELATED APPLICATIONS

This application claims the benefit of U.S. Provisional Application No. 61/333,280, filed May 11, 2010, the entire of which is incorporated herein by reference.

FIELD OF THE INVENTION

The present invention relates generally to a yard or garden accessory enabling the automatic addition of a lawn treatment material, such as fertilizer, herbicide or insecticide, to the water being sprinkled on yard or garden.

BACKGROUND OF THE INVENTION

The proper treatment and care of yards and gardens is highly desirable to prevent destruction from insects and deterioration from malnutrition. The mixture and application of treatment solutions, however, is a time consuming procedure that requires close attention to chemical-water ratios and their distribution. Since proper care equates to scheduled maintenance, many lawns and gardens become neglected, resulting in unnecessary refurbishing costs. Moreover, lawns, gardens, and vegetation still fall victim to improper maintenance, despite consistent care when poorly balanced solutions are administered.

SUMMARY OF THE INVENTION

The chemical dispensing apparatus of this invention provides an apparatus for incorporation into a water supply system a way to deliver lawn treatment chemicals such as fertilizer, herbicide or insecticide to lawns, yards and other botanical and life systems by the controlled application of the chemicals in amounts and periods.

In general, in one aspect, a chemical dispensing apparatus for use in delivery of a treatment solution to a lawn is provided. The apparatus includes a main fluid supply passage configured for connection to a pipe system carrying water under pressure. A housing has an internal cavity, an end having an opening into the internal cavity and a primary discharge port and a drain port. A fluid discharge passage connects the primary discharge port. An internal fluid supply passage connects the main fluid supply passage to the fluid discharge passage. A drain passage connects the internal cavity to the drain port. The internal cavity is connected to the internal fluid supply passage to receive a portion of a fluid flowing through the internal fluid supply passage. A float valve is disposed across the drain passage and across the internal fluid supply passage. The float valve includes a float that is displaced by a fluid flow through the internal fluid supply passage from the main fluid supply passage from a first position where the drain passage is open and the internal fluid supply passage is sealed by the float to a second position where the internal fluid supply passage is open and the drain passage is sealed by the float. The float returns to the first position when the fluid flow is stopped. A container removably disposed within the internal cavity and supported for rotation therein about a horizontal axis. The container configured for the reception of a chemical concentrate. A water turbine is disposed across the internal fluid supply passage and configured to be driven by the fluid flow through the internal fluid supply passage to provide rotational power. The water turbine is operatively connected to the container to provide the rotational power thereto to rotate the container about the horizontal. A siphon tube connects the internal cavity and the internal fluid supply passage, wherein the fluid flow through the internal fluid supply passage results in a vacuum on the siphon tube that causes fluid contained within the internal cavity to be drawn into the fluid flow through the internal fluid supply passage. A lid is removably attached to the housing. The lid seals the opening into the internal cavity when attached to the housing.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which.

DETAILED DESCRIPTION OF THE INVENTION

Figure 1:
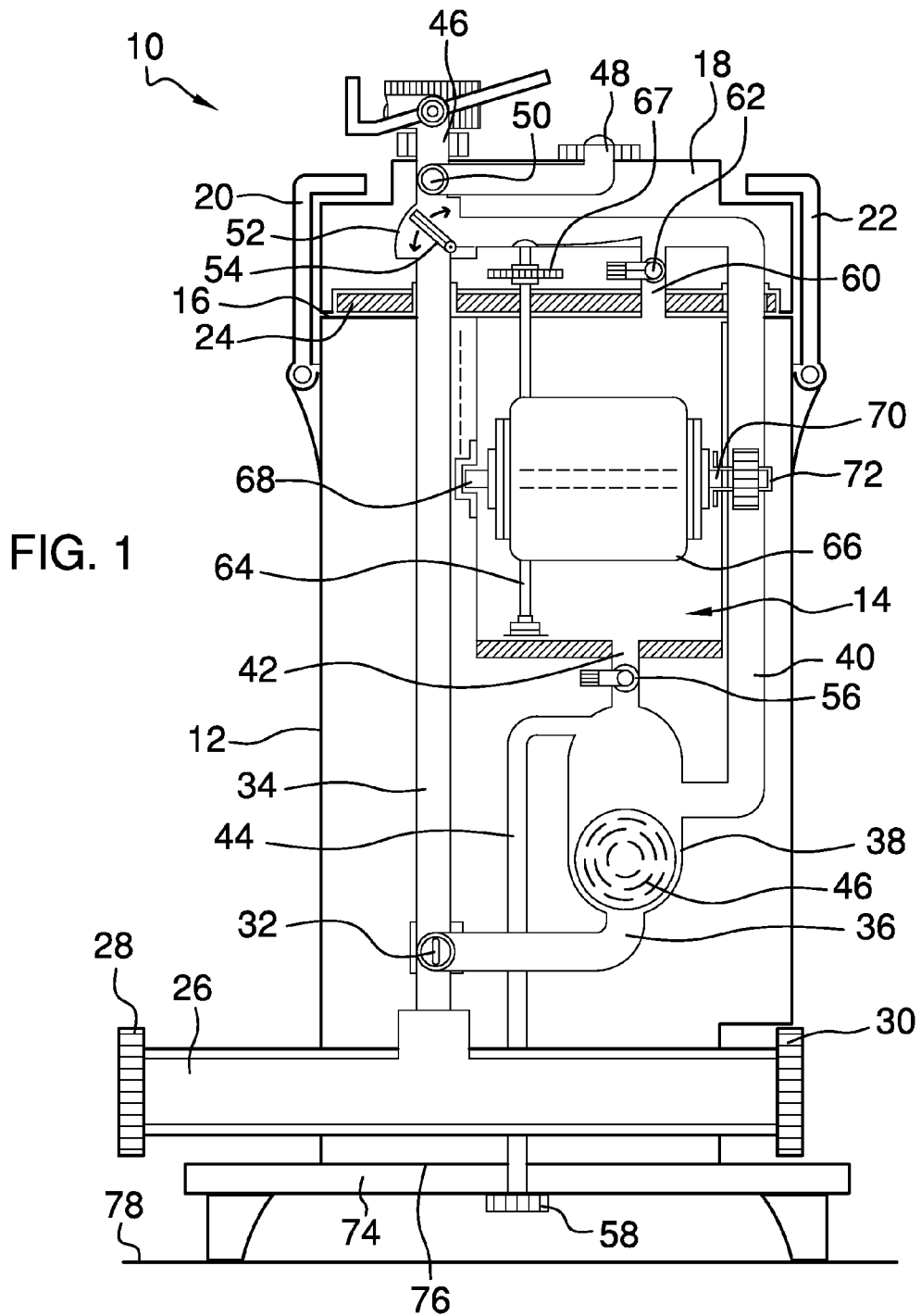
FIG. 1 is a diagrammatic illustration of a specially designed lawn and garden chemical dispenser in accordance with the principals of the invention.

Diagrammatically illustrated in FIG. 1 is a specially designed lawn and garden chemical dispenser 10 particularly useful in dispensing chemicals for treating a lawn or garden. The dispenser 10 includes a housing 12 defining an internal cavity 14 extending through end 16 of the housing. A lid 18 is sealing attached to end 16 of the housing 12 and seals the internal cavity 14. The lid 18 is secured to end 16 by a plurality of clamps 20 and 22 extending the exterior of the housing 12. Each clamp 20 and 22 is pivotally secured at one end to housing 12 for rotation between a first position wherein an opposite end of the clamp is cooperatively engaged with the lid 18 and a second position wherein the opposite end of the clamp is disengaged from the lid, thus permitting removal from the housing 12. As shown, in FIG. 1, the clamps 20 and 22 are in the first position, and securing the lid 18 to end 16 of the housing 12. A seal 24 is disposed between the interface of the lid 18 with end 16 to provide a sealing contact between the lid and the housing 12.

A main fluid passage 26 extends the housing 12 approximate the bottom thereof, and is fitted with couplings 28 and 30 at opposite ends. Couplings 28 and 30 permit the attachment of fluid carrying hoses to the dispenser 10. Couplings 28 and 30 can be of any conventional couplings for connecting fluid carrying hoses, such as a conventional garden water hose.

A three-way valve 32 fluidically connects the main fluid passage 26 to a bypass passage 34 and a first supply passage 36. A float valve 38 down stream the first fluid passage 36 fluidically connects a second supply passage 40, a first drain passage 42 and a second drain passage 44. The second supply passage 40 is fluidically connected at a first end to the float valve 38 at an intermediate longitudinal position, and is fluidically connected at a second end to a first discharge port 46 and a second discharge port 48. Fluid flow through the first and second discharge ports 46 and 48 is selectively controlled by two-way valve 50. Likewise, the bypass passage 34 is fluidically connected to the first and second discharge ports 46 and 48 at a fluid junction 52 between the bypass passage the second supply passage 40. Fluid flowing in a direction from the main fluid passage 26 through the bypass passage 34 is prevented from flowing through the second supply passage 40 at junction 52 by flap valve 54. Likewise, fluid flowing in a direction from the main fluid passage 26 through the second supply passage 40 is prevented from flowing through the bypass passage 34 at junction 52 by the flap valve 54.

The first drain passage 42 fluidically connects the internal cavity 14 at a bottom thereof to a top end of the float valve 38. A one-way valve 56 is disposed across the first drain passage 42 and is operated to control the flow of fluid from the internal cavity 14 to the float valve 38. The second drain passage 44 fluidically connects at a top end of the float valve 38 to a drain port 58. A branch passage 60 fluidically connects the second supply passage 40 to a top end of the internal cavity. A one-way valve 62 is disposed across the branch passage 60 and is operated to control the flow of fluid from the second fluid passage 40 through the branch passage 60 and into the internal cavity.

A siphon tube or discharge tube 64 fluidically connects the internal cavity 14 to the second fluid passage 40 at a position down stream the branch passage 60 and upstream junction 52. A fluid flow rate valve 67 can be included and positioned across the discharge tube 64 to control the flow rate of fluid passing through the discharge tube from the internal cavity and into the second fluid supply passage 40.

In an embodiment, a drum 66 is disposed within the internal cavity 14 and is supported therein for rotation about a longitudinal axis thereof by shaft ends 68 and 70 extending opposite ends of the drum. Shafts 68 and 70 can be supported by conventional bearings for rotation. In an aspect, shaft ends 68 and 70 can be integral with drum 66. In another aspect, shaft ends 68 and 70 are the ends of a single shaft extending the drum 66. Shaft end 70 extends into the second fluid supply passage 40 across the flow of fluid therethrough. A water wheel or water turbine 72 is disposed within the second fluid supply passage 40 and is operatively coupled to shaft end 70 for conjoint rotation therewith. Fluid flowing through the second fluid supply passage 40 operates the water turbine 72. Rotational energy from the turbine is transmitted through shaft end 70 to the drum 66 causing the drum rotate. As is discussed in more detail below, drum 66 can take various forms, such as a solid of chemical concentrate. In other applications, the drum 66 can comprise a perforated screen sidewall circumscribing and enclosing an internal compartment into which a solid chemical concentrate in pellet form can be loaded.

Housing 12 is fitted with a stand 74 at end 76 opposite end 16 thereof for supporting the fluid dispensing device on a ground surface 78.

Figure 2:
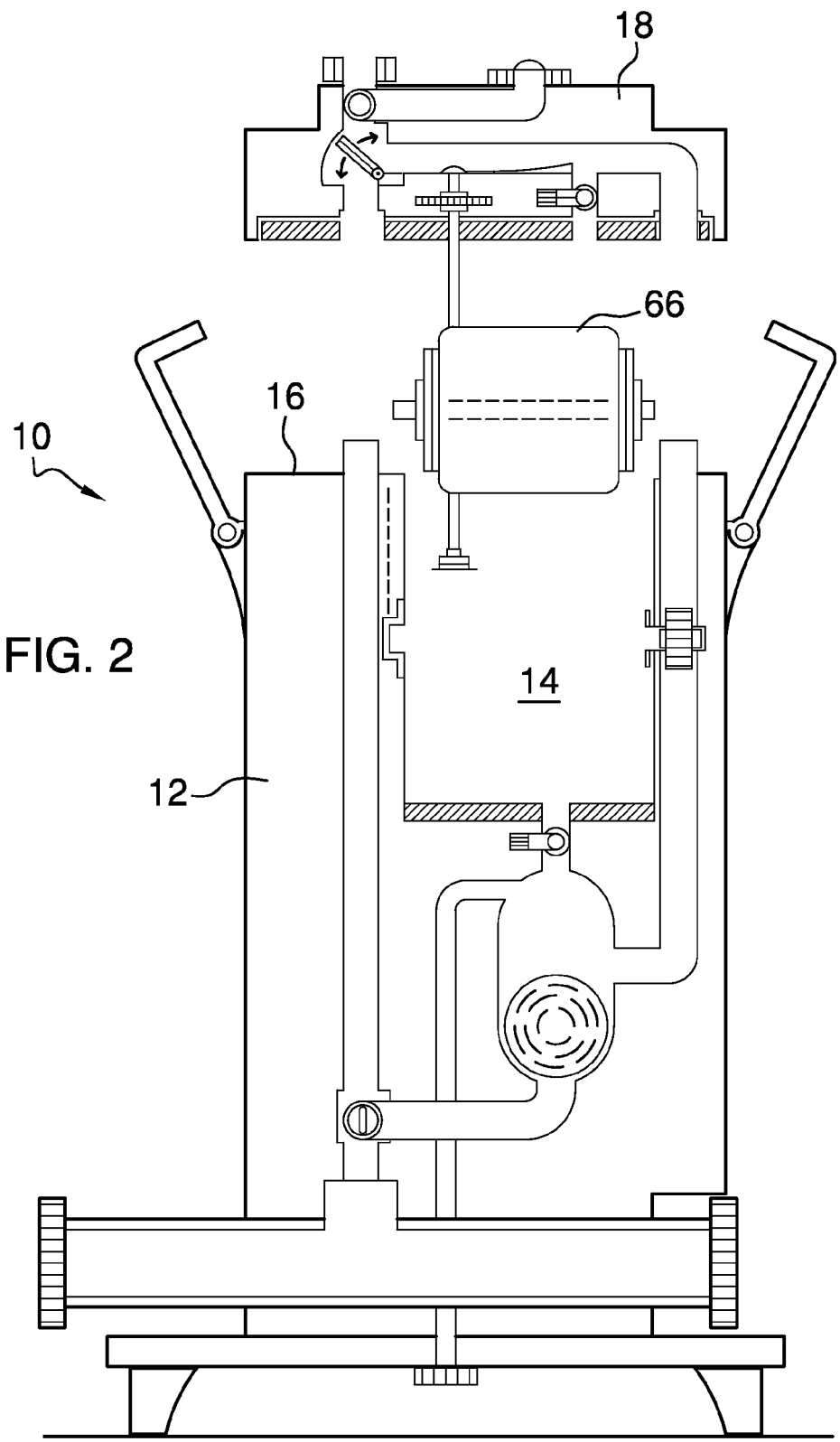
FIG. 2 is a diagrammatic illustration of the dispenser of FIG. 1, wherein the lid is exploded from end of the housing, and the drum removed from the internal cavity.

FIG. 2 is a diagrammatic illustration of the dispenser 10 of FIG. 1, wherein the lid 18 is exploded from end 16 of the housing 12, and the drum 66 is removed from the internal cavity 14.

Figure 3:
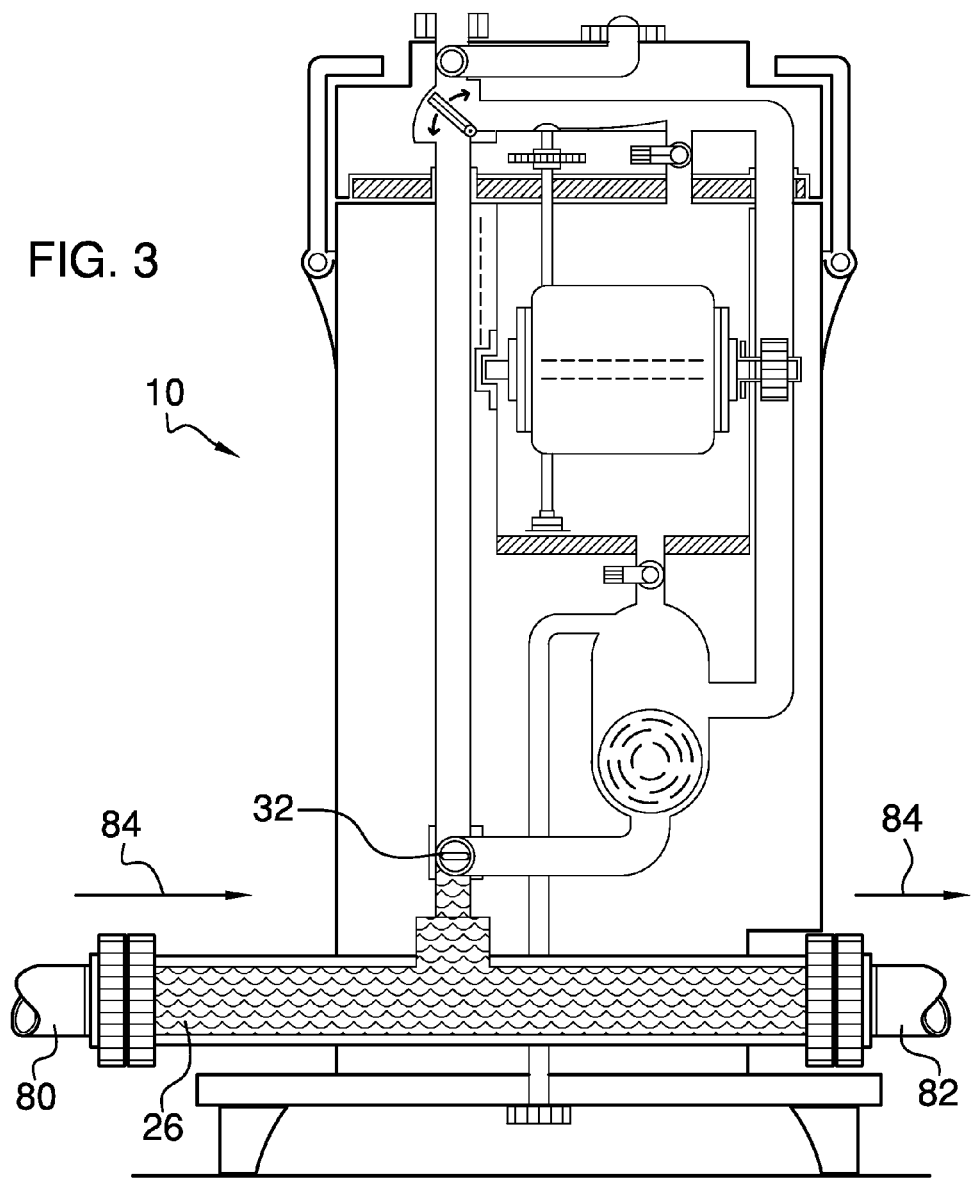
FIG. 3 is a diagrammatic illustration of the dispenser of FIG. 1 in a first mode of operation.

FIG. 3 is a diagrammatic illustration of the dispenser 10 of FIG. 1 in a first mode of operation, and with a first hose 80 connected to fluid coupling 28 and a second hose 82 connected to fluid coupling 30. For discussion herein, the first hose 80 is connected at an opposite end to a source of pressurized water, for example a hose spigot, such that pressurized water flows into the main fluid passage 26 from the first hose 80. In the first mode of operation, valve 32 is operated to only permit fluid flow through the main fluid passage 26 as indicated by arrows 84 between fluid couplings 28 and 30. In this manner, the fluid dispenser 10 is completely bypassed.

Figure 4:
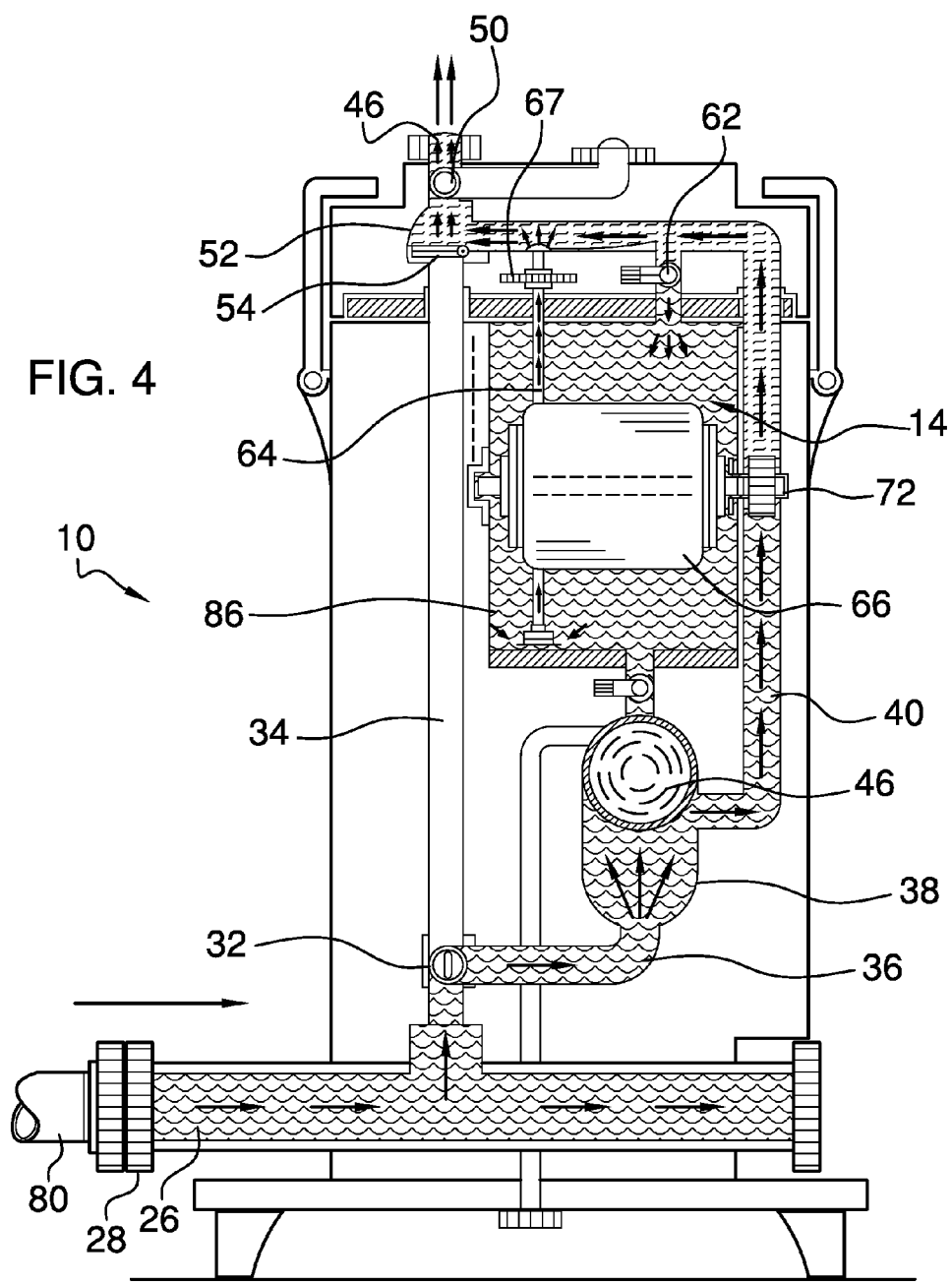
FIG. 4 is a diagrammatic illustration of the dispenser of FIG. 1 in a second mode of operation.

FIG. 4 is a diagrammatic illustration of the dispenser 10 of FIG. 1 in a second mode of operation and with a first hose 80 connected to fluid coupling 28. For discussion herein, the first hose 80 is connected at an opposite end to a source of pressurized water, for example a hose spigot, such that pressurized water flows into the main fluid passage 26 from the first hose 80. In the second mode of operation, valve 32 is operated to permit fluid flow though the first fluid supply passage 36 from the main fluid passage 26, and to prevent fluid flow from the main fluid passage 26 into the bypass passage 34.

As fluid flows through the first fluid supply passage 36 and into the valve 38, the flow of fluid causes weighted ball 46 to rise with within the valve 38 to the top thereof and seal the first and second drain passages 42 and 44, and to only permit flow from the first fluid supply passage 36 through the float valve 38 and into the second fluid supply passage 40. Valve 62 is operated to permit fluid flowing through the second fluid supply passage 40 to enter and fill the internal cavity 14. Fluid continues to flow downstream the second fluid supply passage 40 across the siphon tube 64 into junction 52. The flow of fluid through the second fluid supply passage 40 into junction 52 causes the flap valve 54 seal bypass passage 34. As illustrated, valve 50 is operated to selectively discharge fluid flowing through the second fluid supply passage 40 through the first discharge port 46.

Further, the fluid flow through the second fluid supply passage 40 operates water turbine 72 causing drum 66 to rotate within fluid contained in the internal cavity 14 and dissolving the chemical concentrate solid forming a chemical solution 86 contained within the internal cavity. The chemical solution 86 is dispensed from the internal cavity 14 through the siphon tube 64 by a combination of high fluid pressure within the internal cavity and a drop in fluid pressure across the end of the siphon tube connected to the second fluid supply passage 40 to be admixed with fluid flowing through the second fluid supply passage and discharged from the fluid dispensing device 10. The amount of chemical solution 86 dispensed into the fluid flow through the second fluid supply passage 40 is controlled by valve 66.

Figure 5:
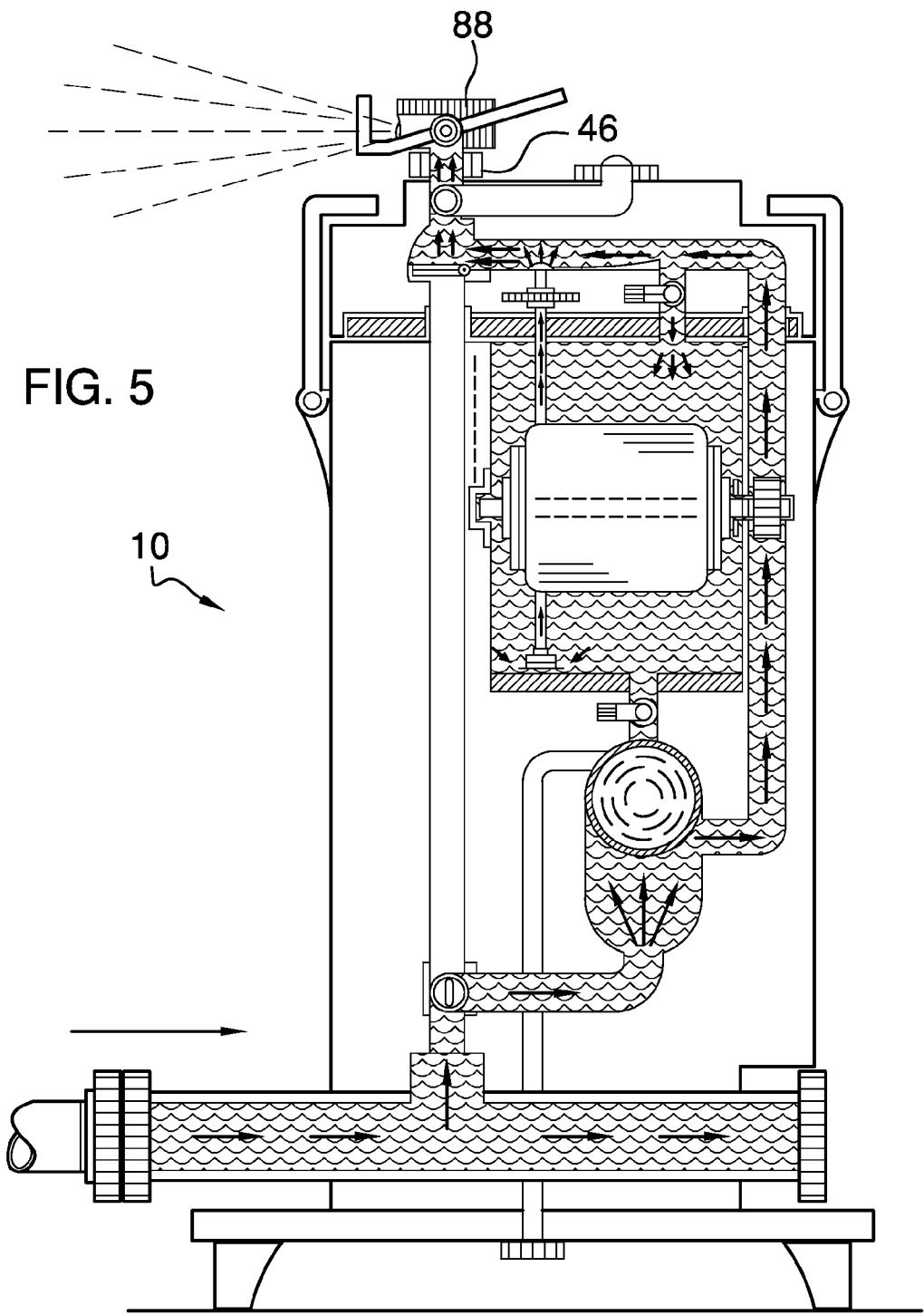
FIG. 5 is a diagrammatic illustration of the dispenser of FIG. 4 having a conventional sprinkler head connected to a discharge port to disperse the fluid flow across the ground surface.

FIG. 5 is a diagrammatic illustration of the dispenser 10 of FIG. 4 having a conventional sprinkler head 88 connected to discharge port 46 to disperse the fluid flow across the ground surface. Further shown is the device 10 in the third mode of operation.

Figure 6:
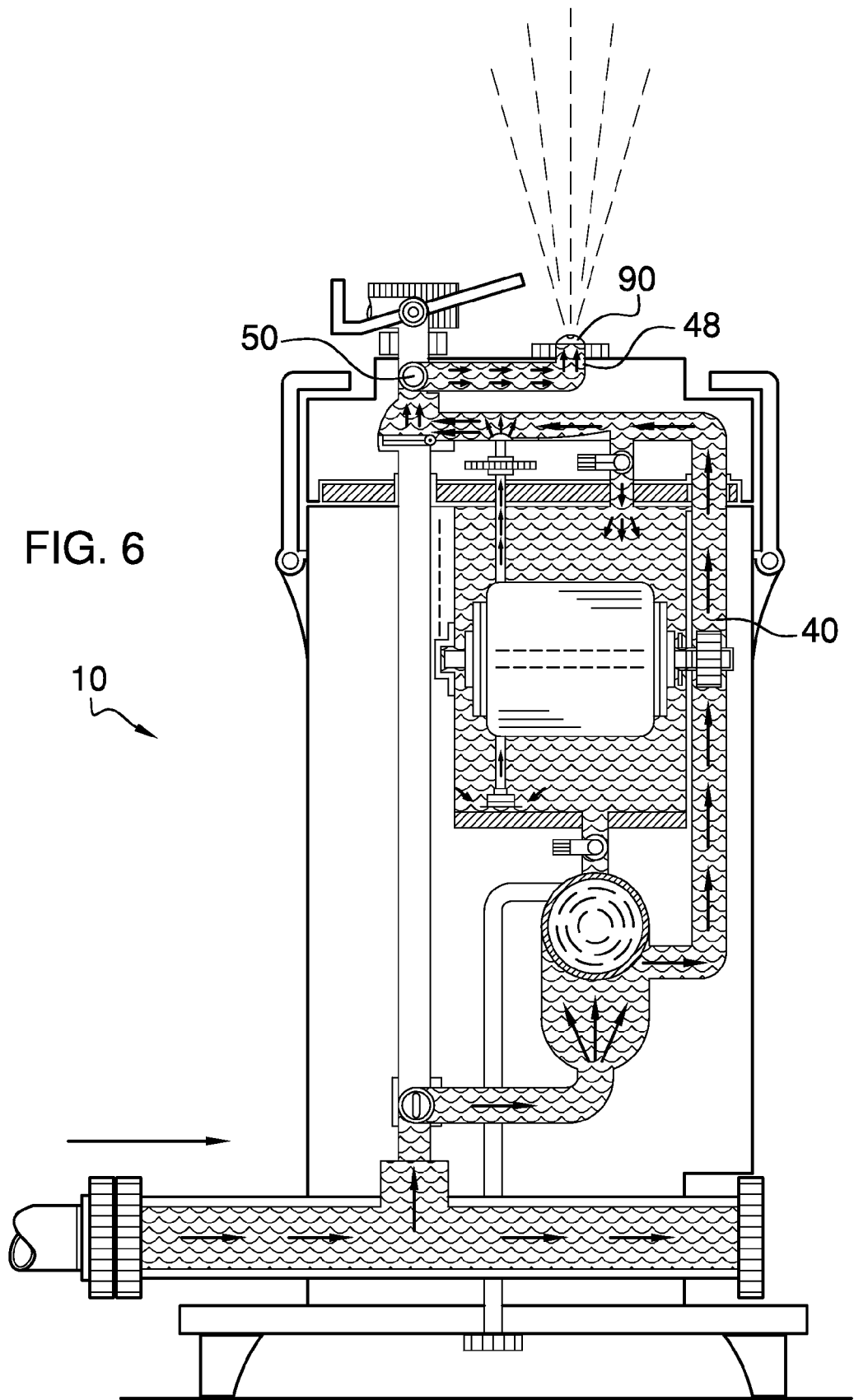
FIG. 6 is a diagrammatic illustration of the dispenser of FIG. 4 having a misting nozzle connected to a discharge port to atomize the chemical into the ambient air.

FIG. 6 is a diagrammatic illustration of the dispenser 10 of FIG. 4, wherein valve 50 is operated to selectively discharge fluid flowing through the second fluid supply passage 40 through the second discharge port 48. As illustrated, the second discharge port 48 is fitted with a misting nozzle 90 to atomize the fluid into the air. This arrangement is particularly useful in the dispensing of a pesticide or insect repellant.

Figure 7:
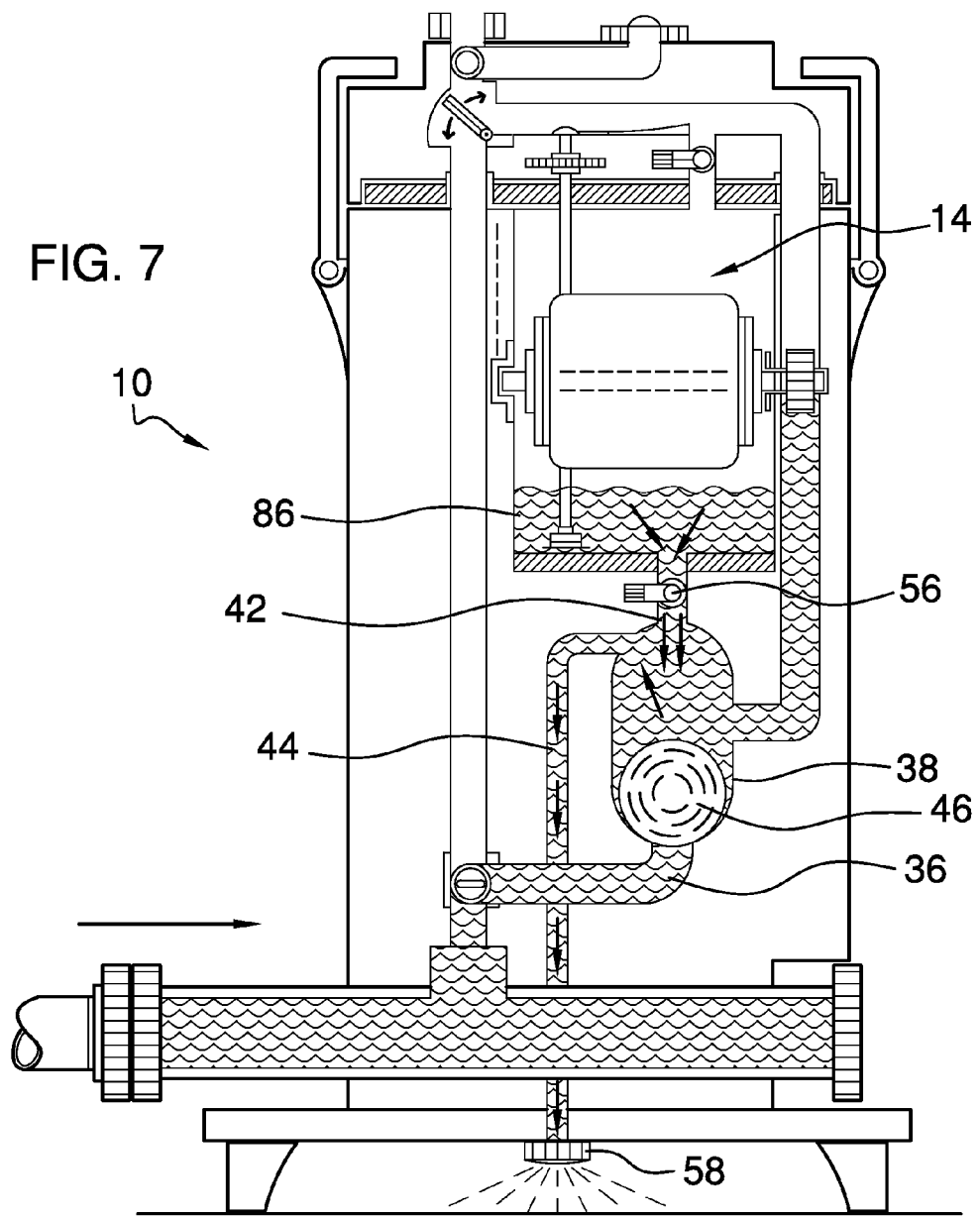
FIG. 7 is a diagrammatic illustration of the dispenser of FIG. 1 in a fourth mode of operation.

FIG. 7 is a diagrammatic illustration of the dispenser 10 of FIG. 1 in a fourth mode of operation, wherein chemical solution 86 is drained from the internal cavity 14. The fourth mode of operation typically takes place immediately following the cessation of the third mode of operation provided valve 56 is operated to permit fluid flow through the first drain passage 42. In this mode, and without a flow of pressurized fluid through the valve 38 the weighted ball 46 falls to the bottom of valve 38 and seals the first fluid supply passage 36 and opens the first and second drain passages 42 and 44. Chemical solution 86 within the internal cavity 14 flows under the force of gravity through the first drain passage 42, through valve 38, through the second drain passage 44 and then finally out of drain port 58. Additionally, with the first fluid passage 36 being sealed by the weighted ball 46, chemical solution contained within the internal cavity is prevented from back flowing into the main flow passage 26. The automatic draining of the internal cavity 14, as descried above, acts to preserve chemical concentrate comprising or contained within drum 66. The automatic draining of the internal cavity 14 can be prevented and thereby overridden by closing valve 56, which seals the first drain passage 42.

Figure 8:
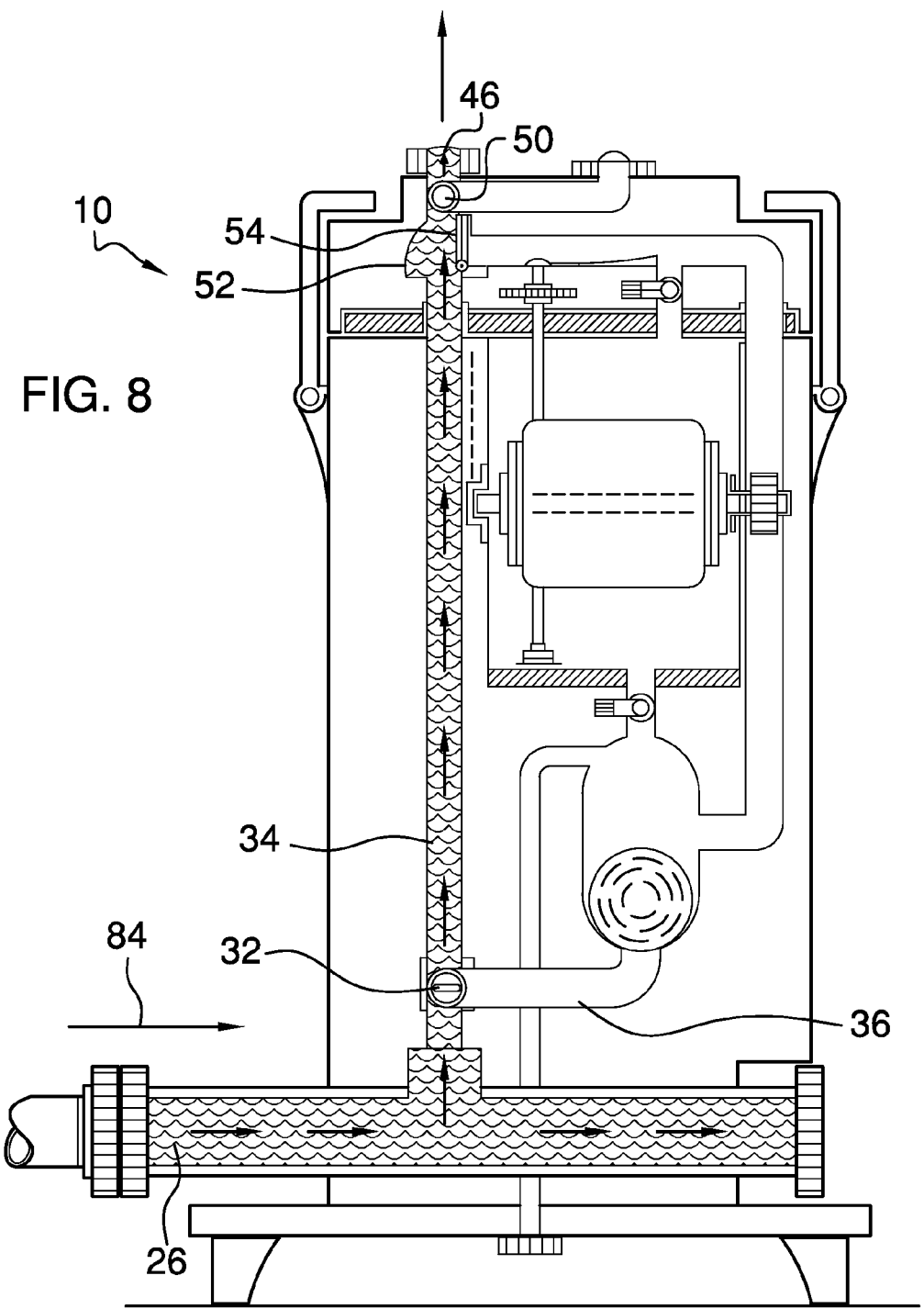
FIG. 8 is a diagrammatic illustration of the dispenser of FIG. 1 in a fifth mode of operation.

FIG. 8 is a diagrammatic illustration of the dispenser 10 of FIG. 1 in a fifth mode of operation. In the fifth mode of operation, valve 32 is operated to permit fluid flow through the bypass passage 34 and to prevent fluid flow through the first fluid supply passage 36. In this manner, fluid from the main fluid passage 26 flows through the bypass passage 34 into junction 52. The flow of fluid through the bypass passage 34 into junction 52 causes the flap valve 54 seal the second fluid supply passage 40. As illustrated, valve 50 is operated to selectively discharge fluid flowing through the bypass passage 34 through the first discharge port 46. This mode of operation permits the dispensing of fresh water only.

Figure 9:
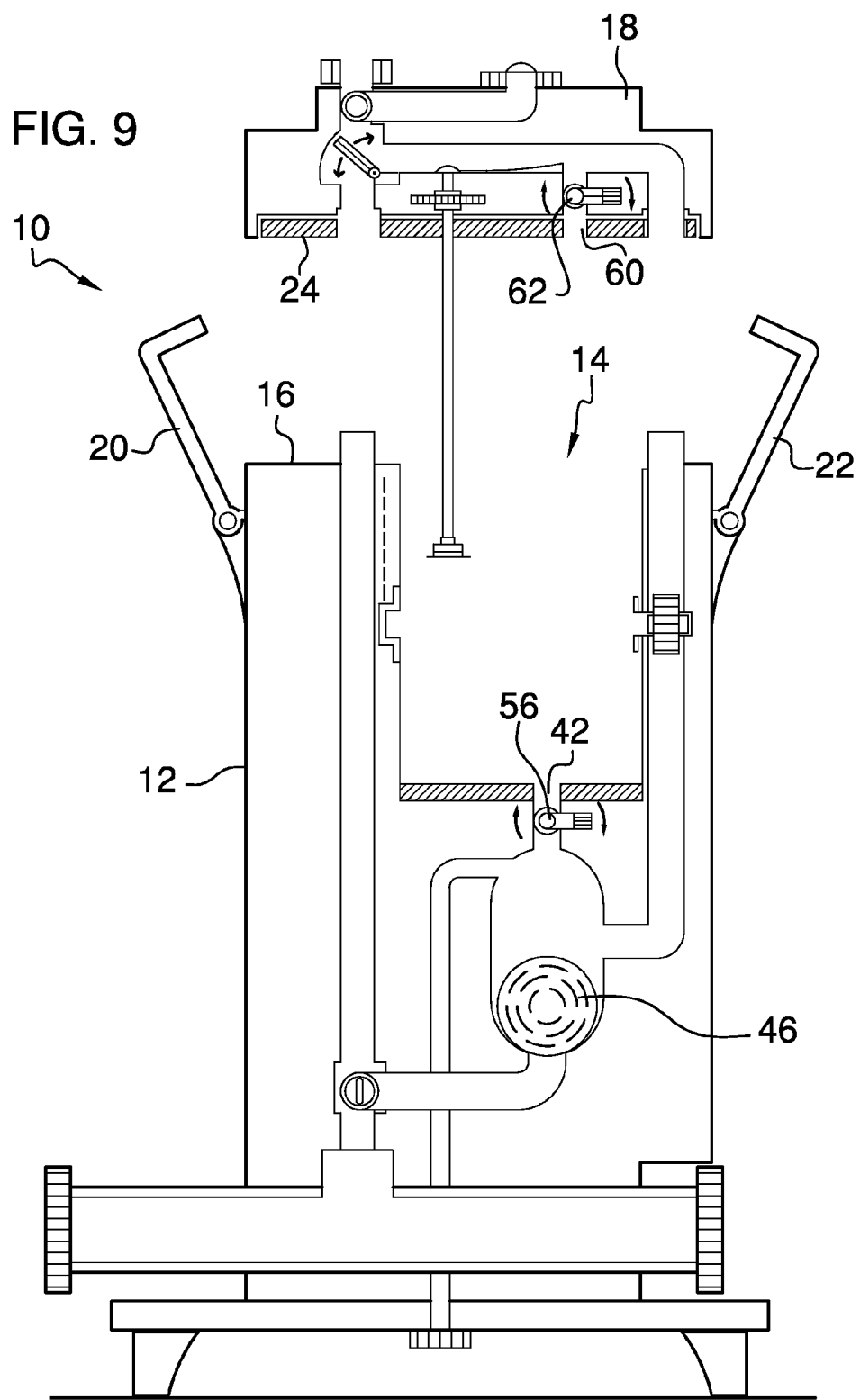
FIG. 9 is a diagrammatic illustration of the dispenser of FIG. 1 shown in use in the fourth mode of operation without the drum.

FIG. 9 is a diagrammatic illustration of the dispenser 10 of FIG. 1 configured for operation in a fourth mode of operation for receiving and dispensing a liquid chemical concentrate. As depicted, the cover 18 is detached from the housing 12 to enable the operator access to the internal cavity 14 and to remove the drum 66 (not shown). Valve 56 and valve 62 that were previously in the open position in the second mode of operation are now in the closed position sealing the first drain passage 42 and the branch passage 60, respectively. The closure of valve 56 makes it possible for the internal cavity 14 to hold and retain liquid without water pressure moving the weighted ball 46 to seal then end of the first drain passage 42. The closure of valve 62 prevents water from flowing from passage 40 through passage 62 and into the internal cavity 14 to avoid dilution of the liquid chemical solution inside the internal cavity. However, valve 62 can be adjust to permit a set inflow of water at the operator's command. Liquid chemical concentrate can now be deposited in the internal cavity 14 and the cover 18 with the seal 24 is now placed on end 16 of the housing 12 and is clamped by clamps 20 and 22 to prevent leakage when in use as shown in FIG. 10.

Figure 10:
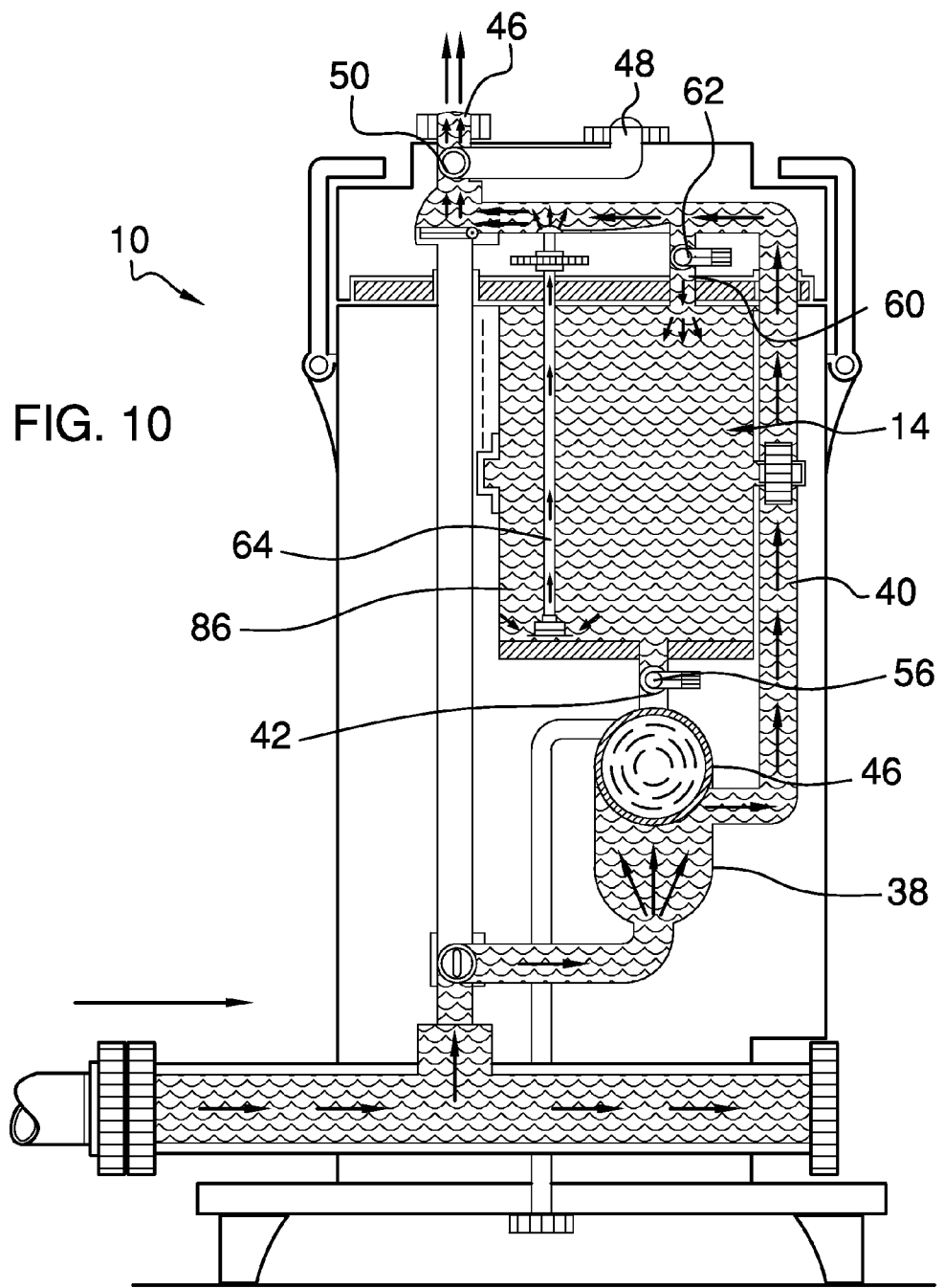
FIG. 10 is diagrammatic illustration of the dispenser of FIG. 9, wherein the lid is exploded from the housing.

FIG. 10 is a diagrammatic illustration of the dispenser 10 of FIG. 9 shown in use in the fourth mode of operation dispensing a chemical solution 86 through discharge port 46. Valve 62 in the closed position seals the branch passage 60 and preventing a flow of water therethrough into the internal cavity. Valve 56 in the closed position seals the first drain passage 42, and thus overriding the automatic drain system as described above. As supply water flows into valve 38, the pressure of the supply water causes the weighted ball 46 to rise and permit flow of the supply water into passage 40 bypassing the internal cavity 14. The supply water continues to flow across the siphon tube 64 causing liquid chemical concentrate contained within the internal cavity 14 to be drawn into and admixed with the water flow and dispensed through discharge 46. However, valve 50 could be operated to permit dispensing through discharge 48.

Figure 11:
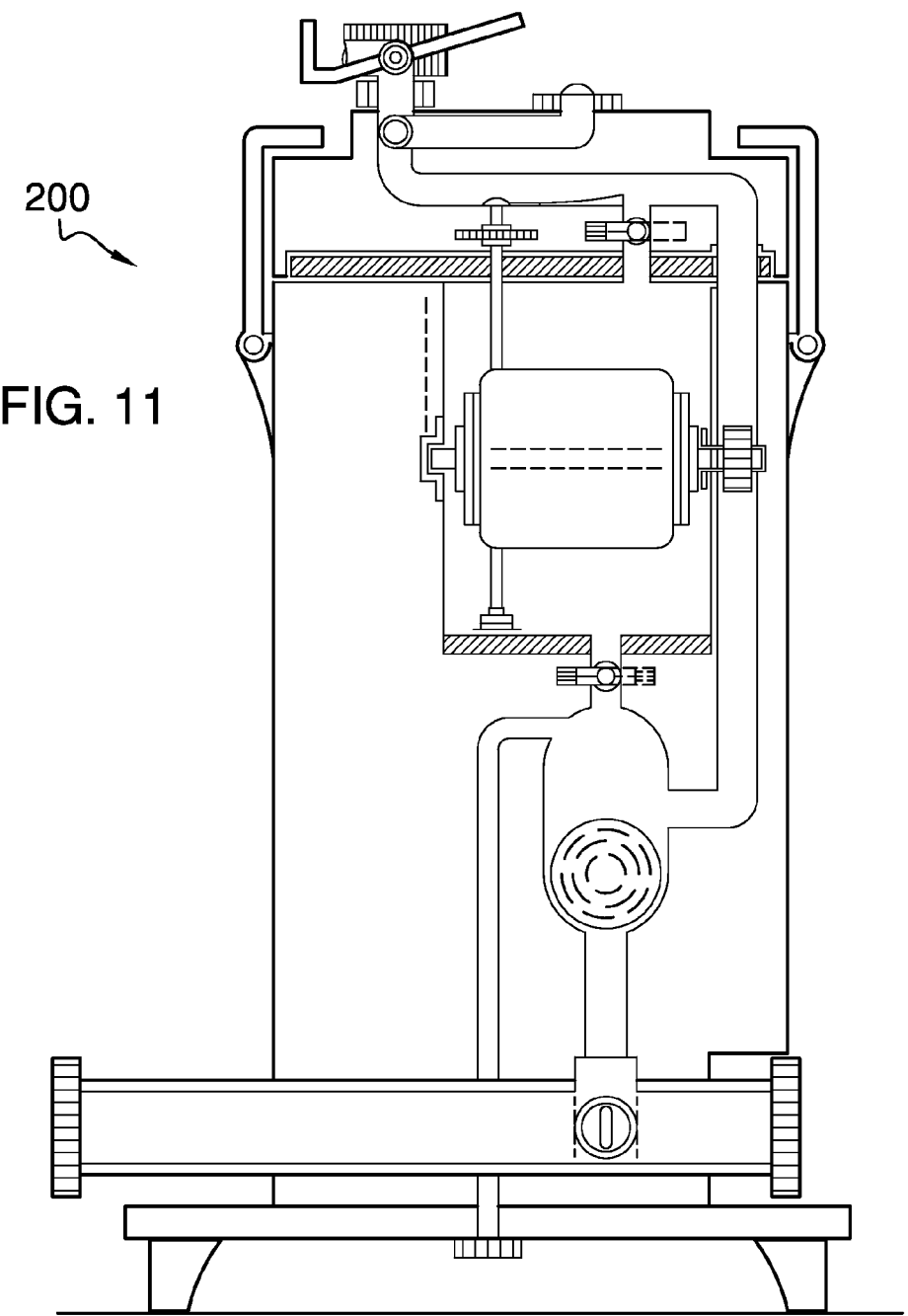
FIG. 11 is a diagrammatic illustration of an alternative construction of the dispenser of FIG. 1.

FIG. 11 is a diagrammatic illustration of an alternative construction of the dispenser 10. Here, the dispenser 200 does not include the bypass passage 34, and thus junction 52 and valve 54 is eliminated.

Figure 12:
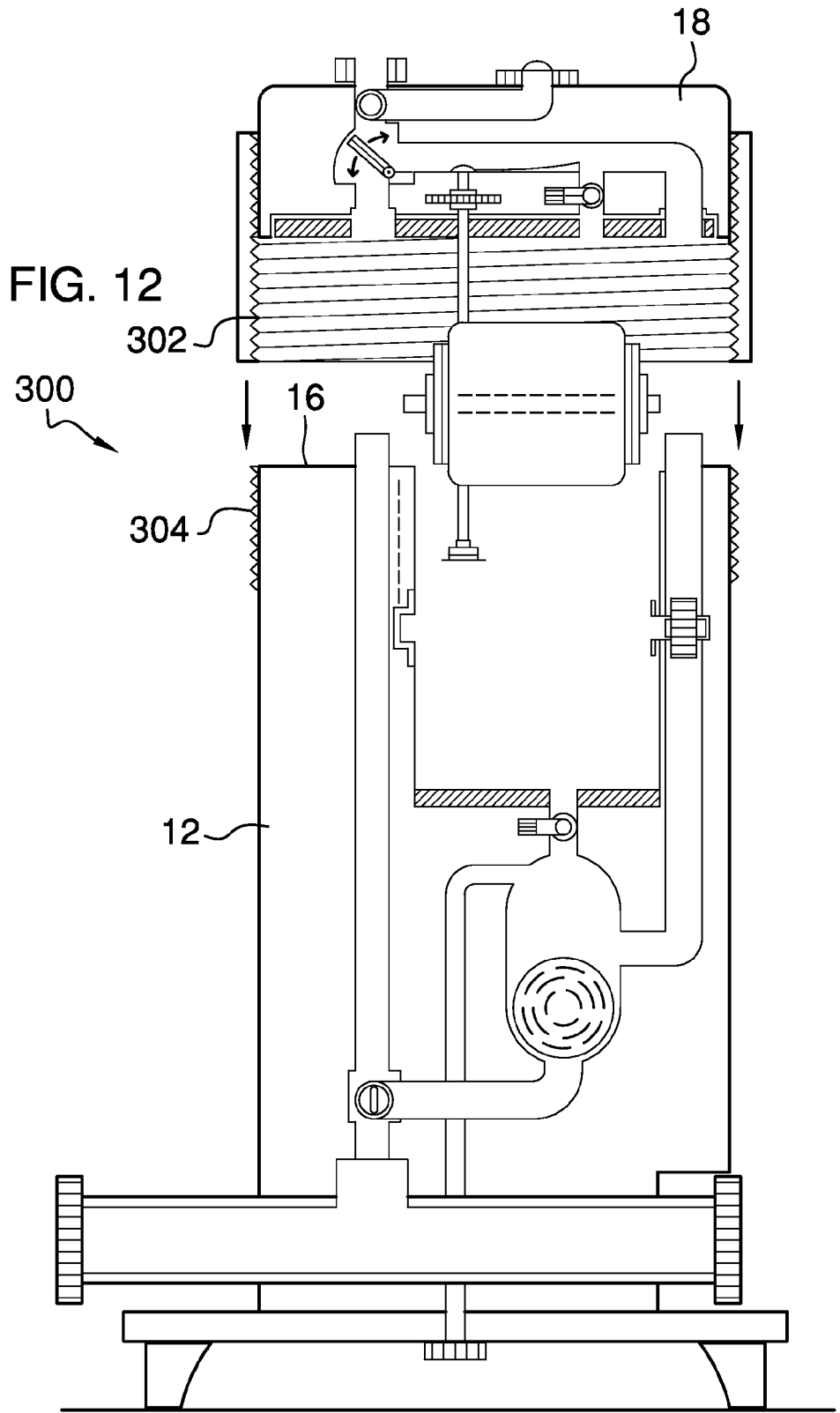
FIG. 12 is a diagrammatic illustration of yet another an alternative construction of the dispenser of FIG. 1.

FIG. 12 is a diagrammatic illustration of an alternative construction of the dispenser 10. Here, the fluid dispensing device 300 does not include clamps 20 and 22. Alternatively, lid 18 and end 16 of housing 12 are threadably coupled by cooperating screw threads 302 and 304 on the lid and end 16, respectively. FIG. 12 further illustrates lid 18 exploded from housing 12.

Figure 13:
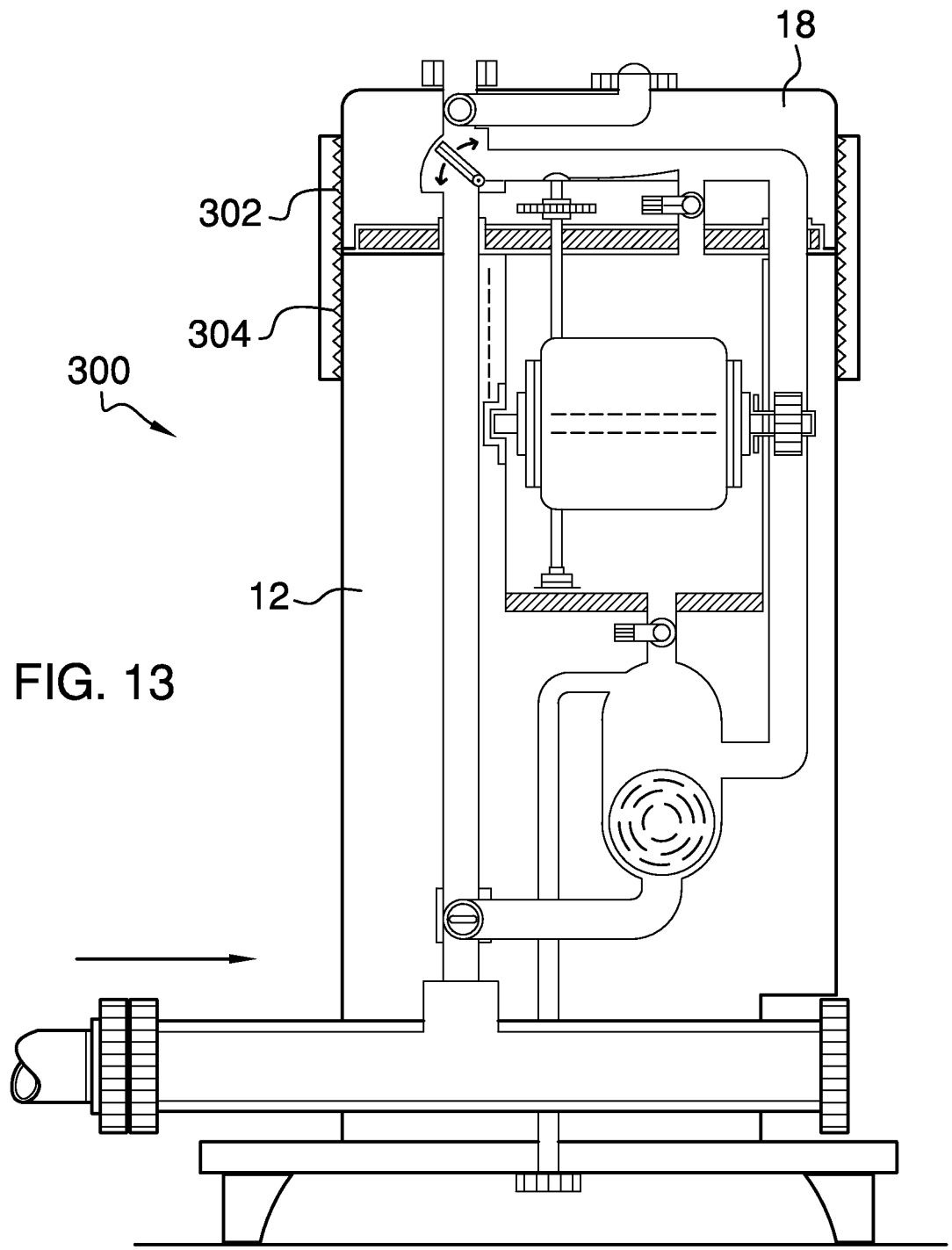
FIG. 13 is a diagrammatic illustration of the dispenser of FIG. 12, wherein the lid is threaded to the housing.

FIG. 13 is a diagrammatic illustration of the dispenser 300 of FIG. 12, wherein the lid 18 is threaded to end 16 of the housing 12.

Figure 14:
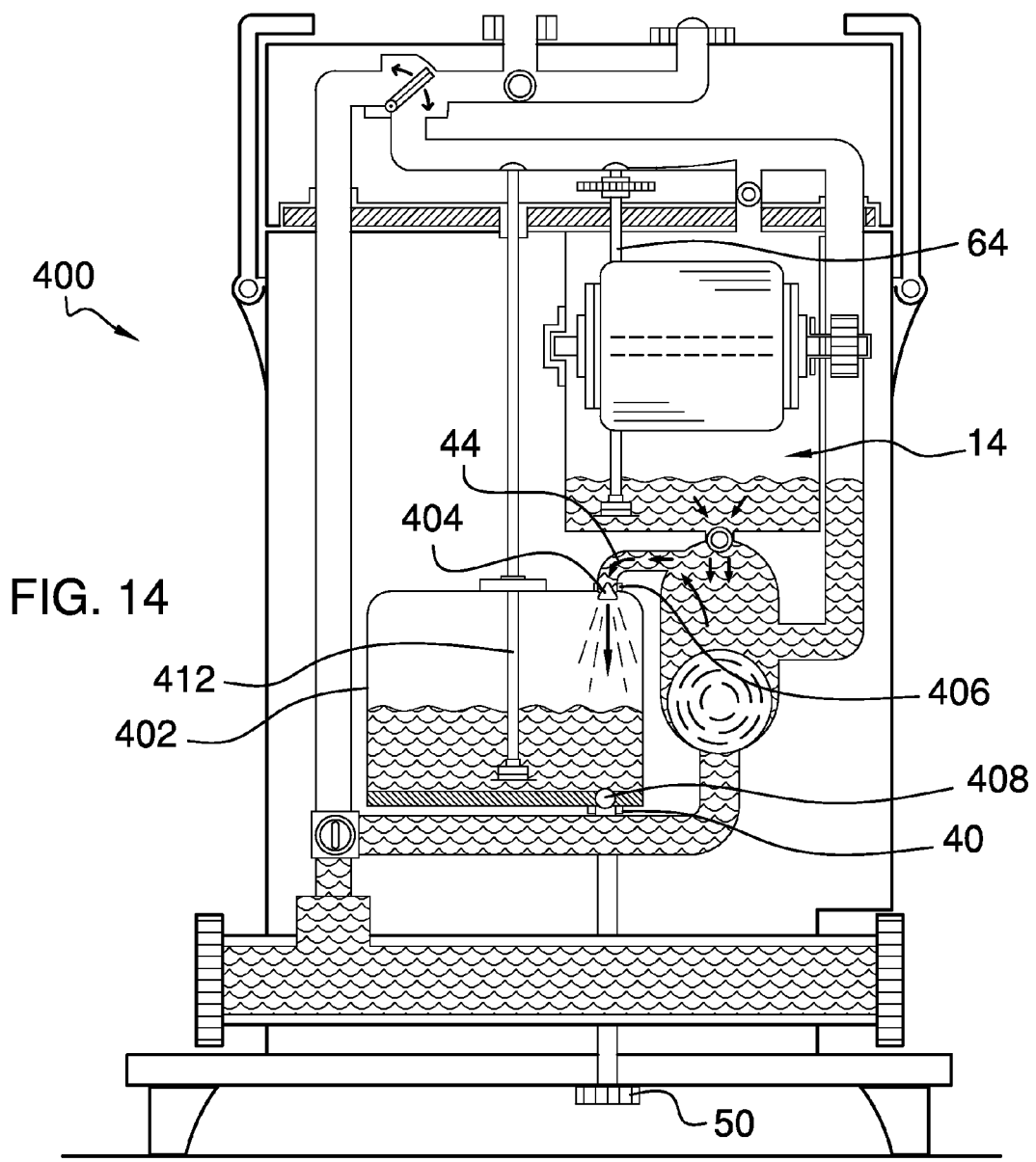
FIG. 14 is a diagrammatic illustration of yet another an alternative construction of the dispenser of FIG. 1.

FIG. 14 is a diagrammatic illustration of an alternative construction of the dispenser 10 of FIG. 1. Here, the fluid dispensing device 400 includes an internal reservoir tank 402 in fluidic communication with the second drain passage 44 to receive therein for storage for later use chemical solution drained from the internal cavity 14. A check valve 404 is placed across the second drain passage 44 at junction 406 between the second drain passage and the tank 402. Check valve 404 only permits flow into tank 402 from the second drain passage 44. Valve 408 is placed across the second drain passage 44 at junction 410 between the second drain passage and the tank 402. Valve 408 is operated to control flow from tank 402 through drain port 50. A second siphon tube or discharge tube 412 fluidically connects tank 402 to the second fluid supply passage 40 at a location downstream of the first siphon tube 64. The second siphon tube 412 operates to discharge or dispense chemical solution within tank 402 into the flow of fluid through the second supply passage 40 to be admixed with the fluid therein.

Figure 15A:
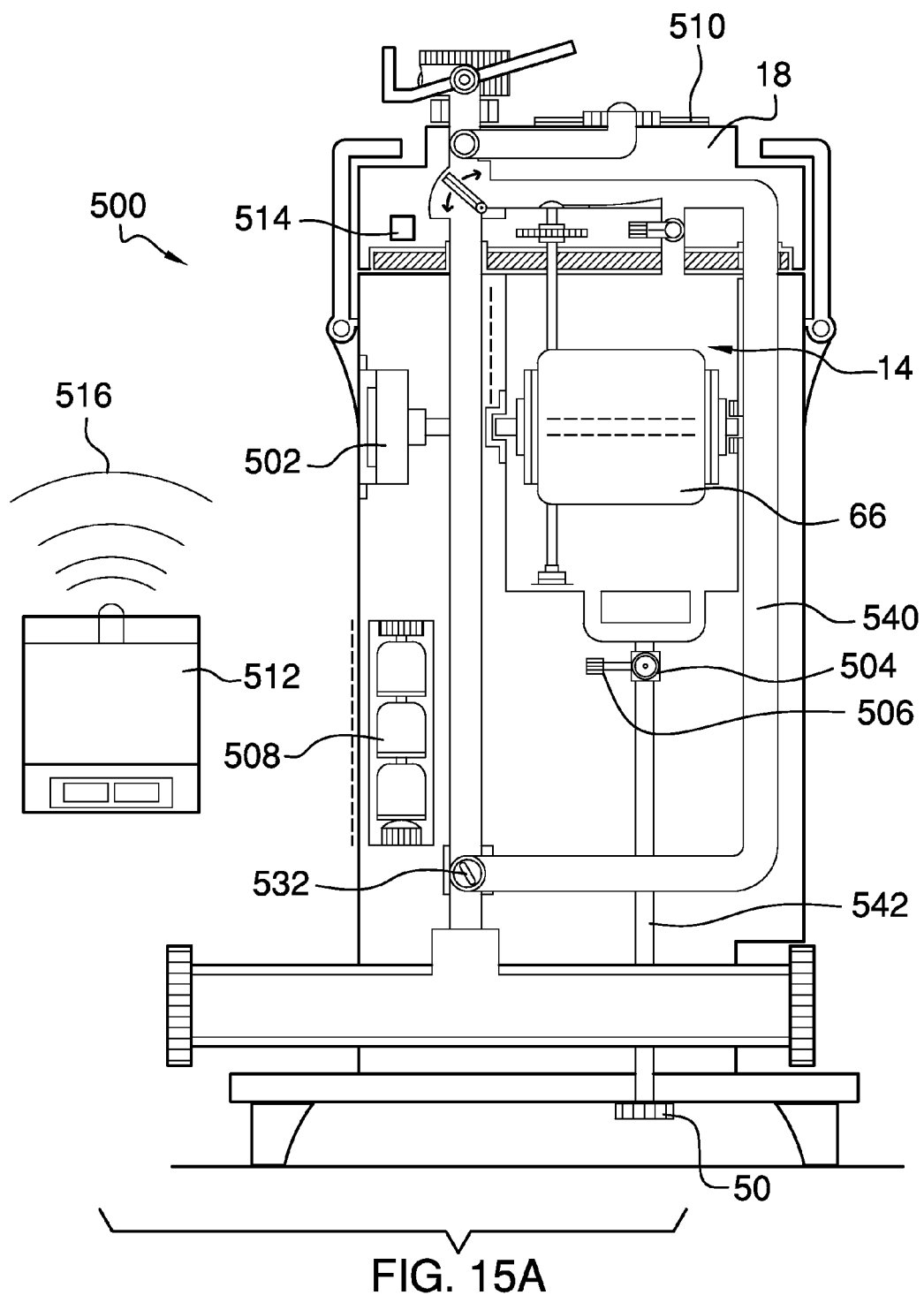
FIG. 15A is a diagrammatic illustration of yet another an alternative construction of the dispenser of FIG. 1.

FIG. 15A is a diagrammatic illustration of an alternative construction of the dispenser 10 of FIG. 1. Here, in fluid dispensing device 500, valve 38 has been eliminated which also eliminates the first fluid supply passage 36 and the second drain passage 44. Further, the water turbine 72 has been replaced with an electric motor 502 operatively connected to drum 66 for rotating the same within the internal cavity 14. An electrically operated valve 504 having a manual control lever 506 is placed across drain passage 542. Valve 32 is replaced by an electrically operated valve 532 having a manual control. Valve 504 is operated to control the draining of chemical solution contained within internal cavity 14 through drain port 50. A power supply, such as batteries 508 is included to provide power to the various electrical components, such as the valve 504 and motor 502. A solar panel 510 can be provided, such as on lid 18 or elsewhere to recharge the batteries 508. Further, a wireless remote control 512 and a controller 514 having a receiver to receive a wireless command single 516 from the remote control can be provided to control the various functions of the fluid dispensing device 500. All of the electronic components are conventionally, operatively connected.

Additionally, the dispenser 500 of FIG. 15 could be powered by electricity from external source such as house hold electric socket or from on board power source such as the solar panel for running the electrical motor 502 and the other various electrical components. Controller 514 can enable the operator to operate the dispenser 500 when the handheld remote controller 512 is not available. The electrical and manually controlled valves 504 and 532 could function cooperatively to in a coordinated manner as an automatic drain system as in the dispenser 10 of FIG. 1. For example, when valve 532 is positioned or actuated to direct water to enter the supply conduit 540, valve 504 will be operated to close the drain passage 542 so as to enable the internal cavity 14 to receive and hold liquid for operation. Alternatively, as the supply water is shut off either at valve 532 or from the main supply source, valve 504 can be operated to open to permit the liquid within the internal cavity 14 to drain into a storage tank (not shown) or out through drain port 50. Valve 504 could also be manually override through the control lever 506 to open or close as needed by the operator.

Figure 15B:
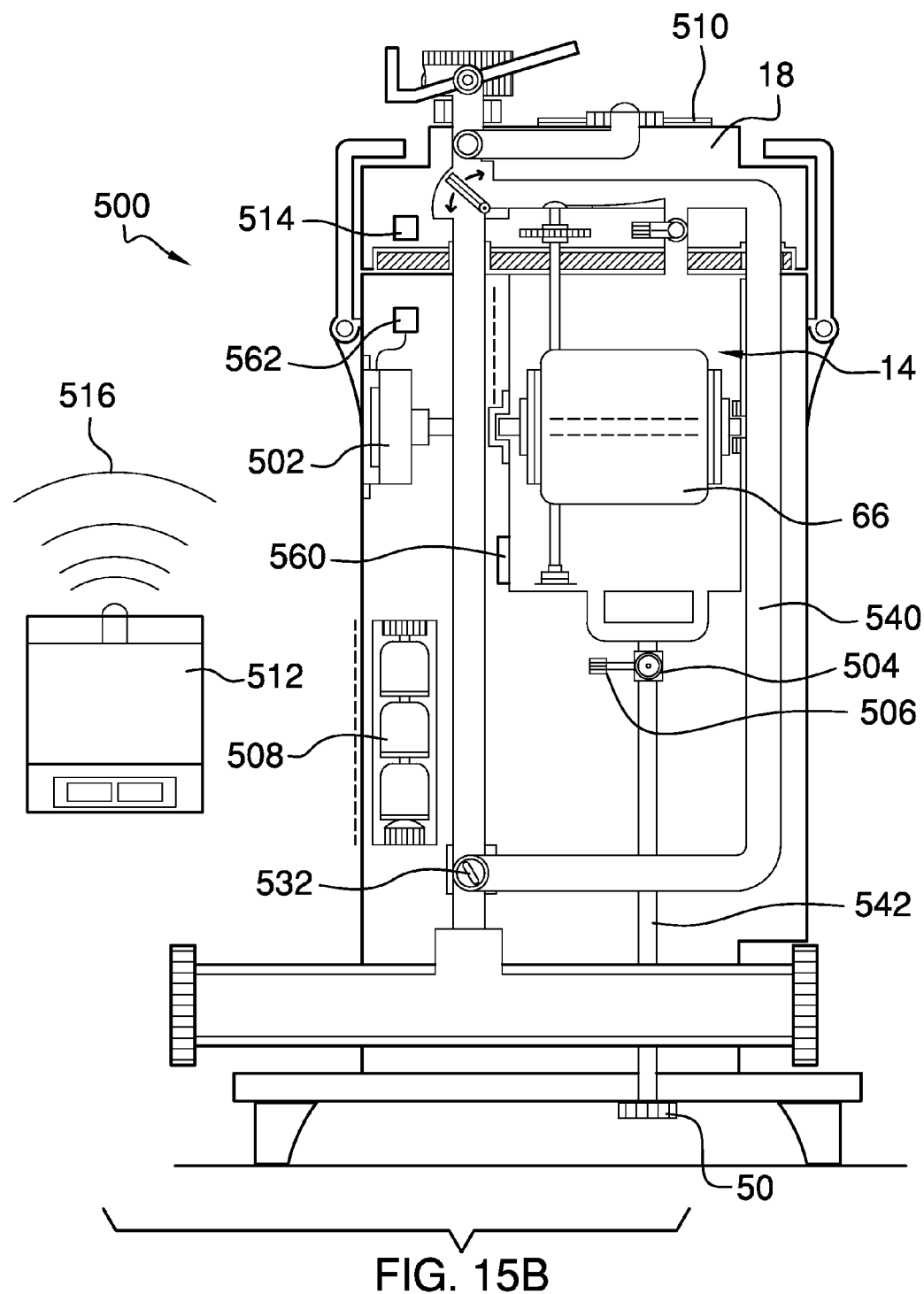
FIG. 15B is a diagrammatic illustration of yet another an alternative construction of the dispenser of FIG. 15A.

FIG. 15B is a diagrammatic illustration of an alternative construction of the dispenser 500 of FIG. 15A. Here the dispenser 500 can further include a chemical concentrate sensor 560 and a motor controller 562. Sensor 560 and controller 562 are operatively connected and controlled to maintain a desired chemical solution concentrate within the internal cavity 14. The chemical solution concentrate is controlled by adjusting the speed, the direction or rotation of the electric motor 502 such as to and fro rotation and duration of rotation during operation from signal received from the controller or sensor. In the, the sensor could detect a high or low concentration of chemical solution inside the internal cavity 14 and then transfer such single to the controller to regulate the operation of the electric motor 502 which in turns move the chemical material 66. Hence such rotation of the chemical material 66 facilitates the making of chemical solution and its concentration. This way the consistency of the chemical solution inside the internal cavity 14 could be regulated prior to admixing with the fluid inside passage 540.

Figure 16:
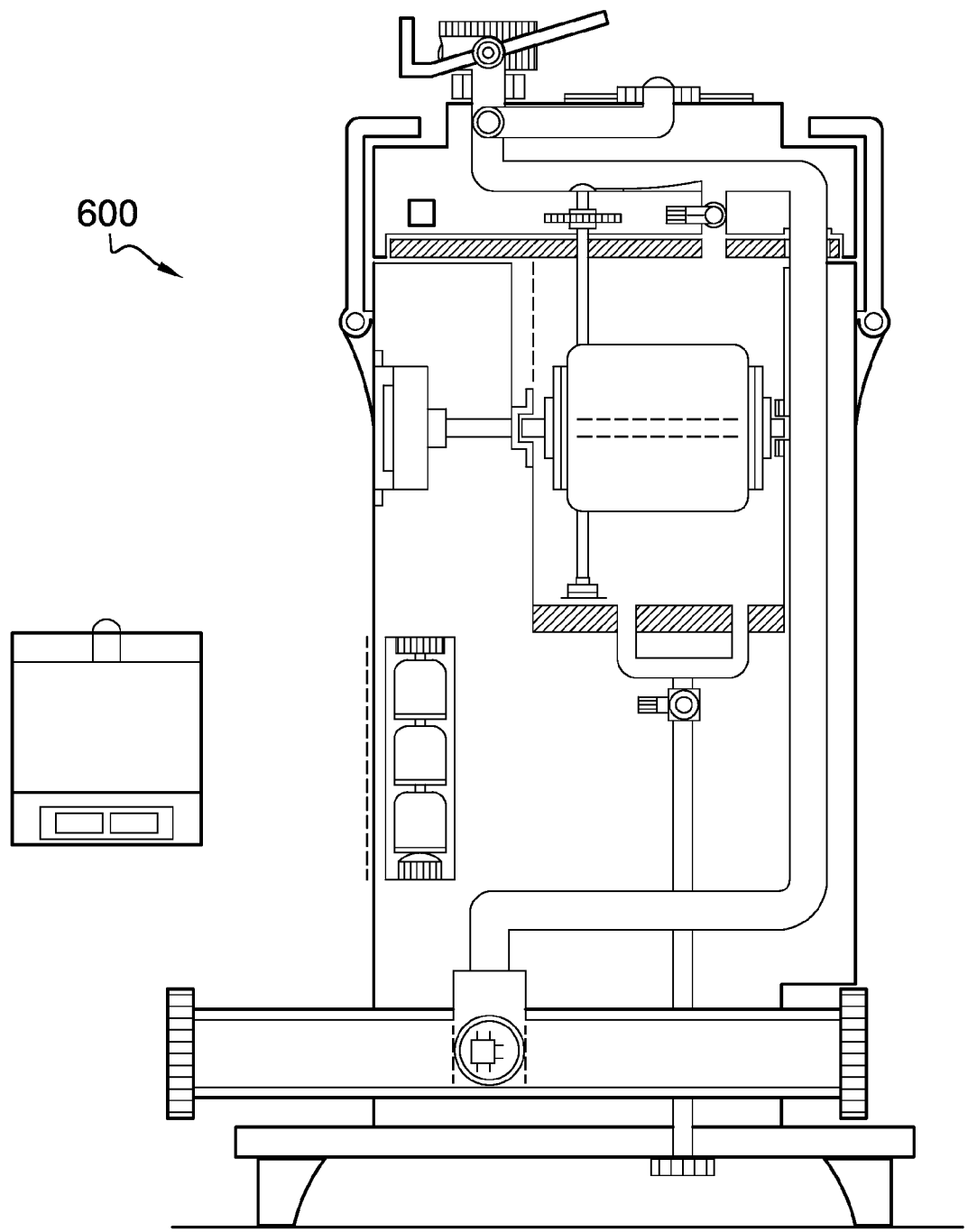
FIG. 16 is a diagrammatic illustration of an alternative construction of the dispenser of FIG. 15.

FIG. 16 is a diagrammatic illustration of an alternative construction of the dispenser 500 of FIG. 15. Here, the dispenser 600 is a combination of fluid dispensing device 200 and fluid dispensing device 500, wherein it does not include the bypass passage 34, and thus junction 52 and valve 54 is eliminated.

Figure 17:
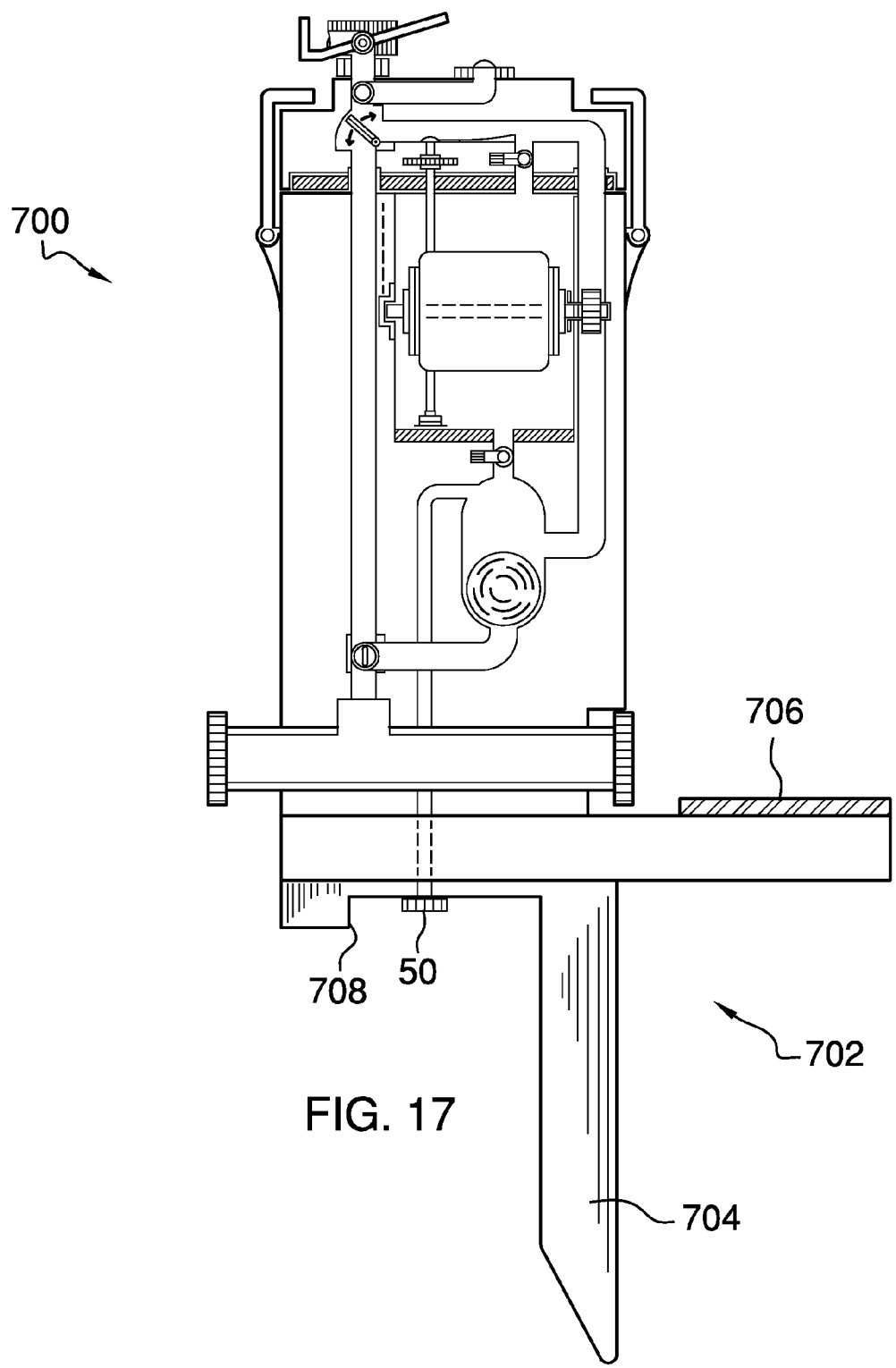
FIG. 17 is a diagrammatic illustration of yet another an alternative construction of the dispenser of FIG. 1.

FIG. 17 is a diagrammatic illustration of an alternative construction of the dispenser 10 of FIG. 1. Here, the fluid dispensing device 700 includes a ground stake 702 as opposed to the stand 74 of dispenser 10. Ground stake 702 includes a spike portion 704 for inserting into the ground surface. A step 706 is provided at the top of the spike portion 704 for assisting in inserting the spike portion into the ground surface by stepping on the step. Drain port 50 is positioned within recessed portion 708 to provide a space or gap between the ground surface and the drain port to permit flow to flow out from the drain port.

Figure 18:
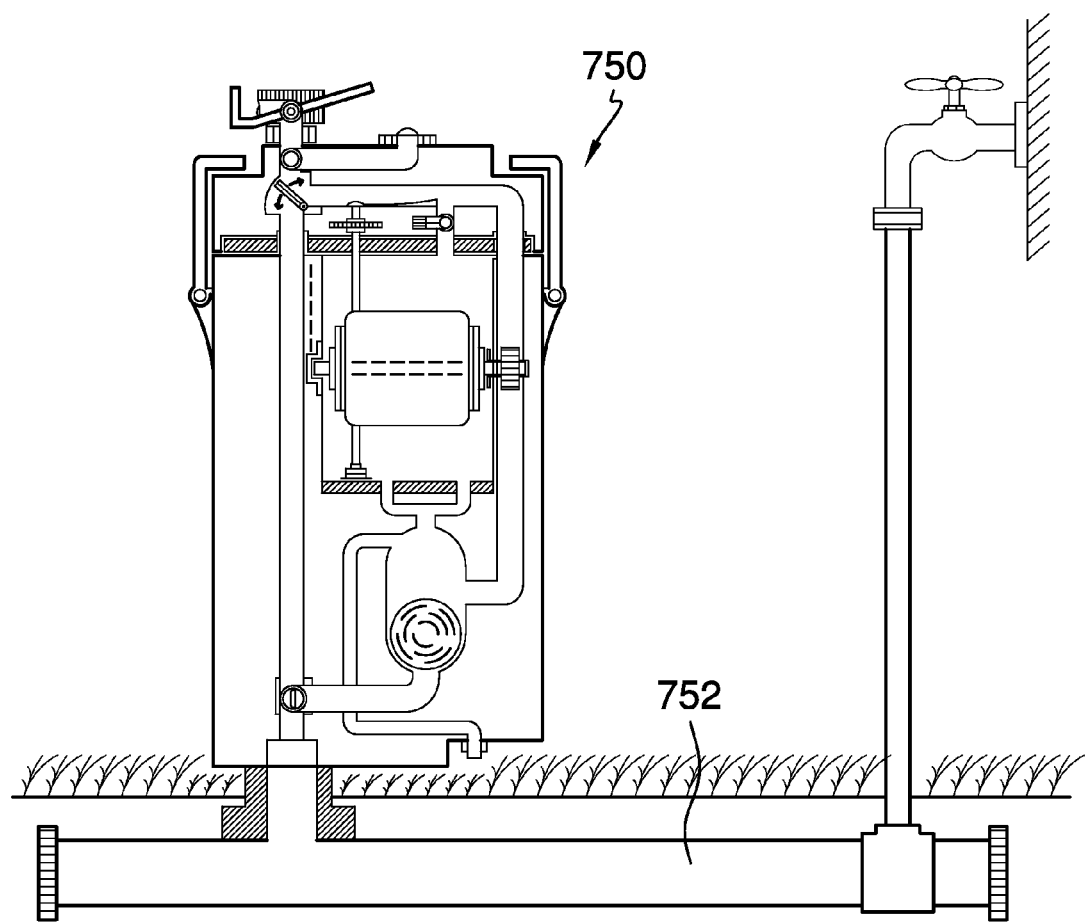
FIG. 18 is a diagrammatic illustration of yet another an alternative construction of the dispenser of FIG. 1.

FIG. 18 is a diagrammatic illustration of an alternative construction of the dispenser 10 of FIG. 1. Here, the fluid dispensing device 750 is shown in an alternative installed configuration where the device 700 is hard plumb with a conduit 752 buried below the ground surface, such as a conventional lawn sprinkler system.

Figure 19:
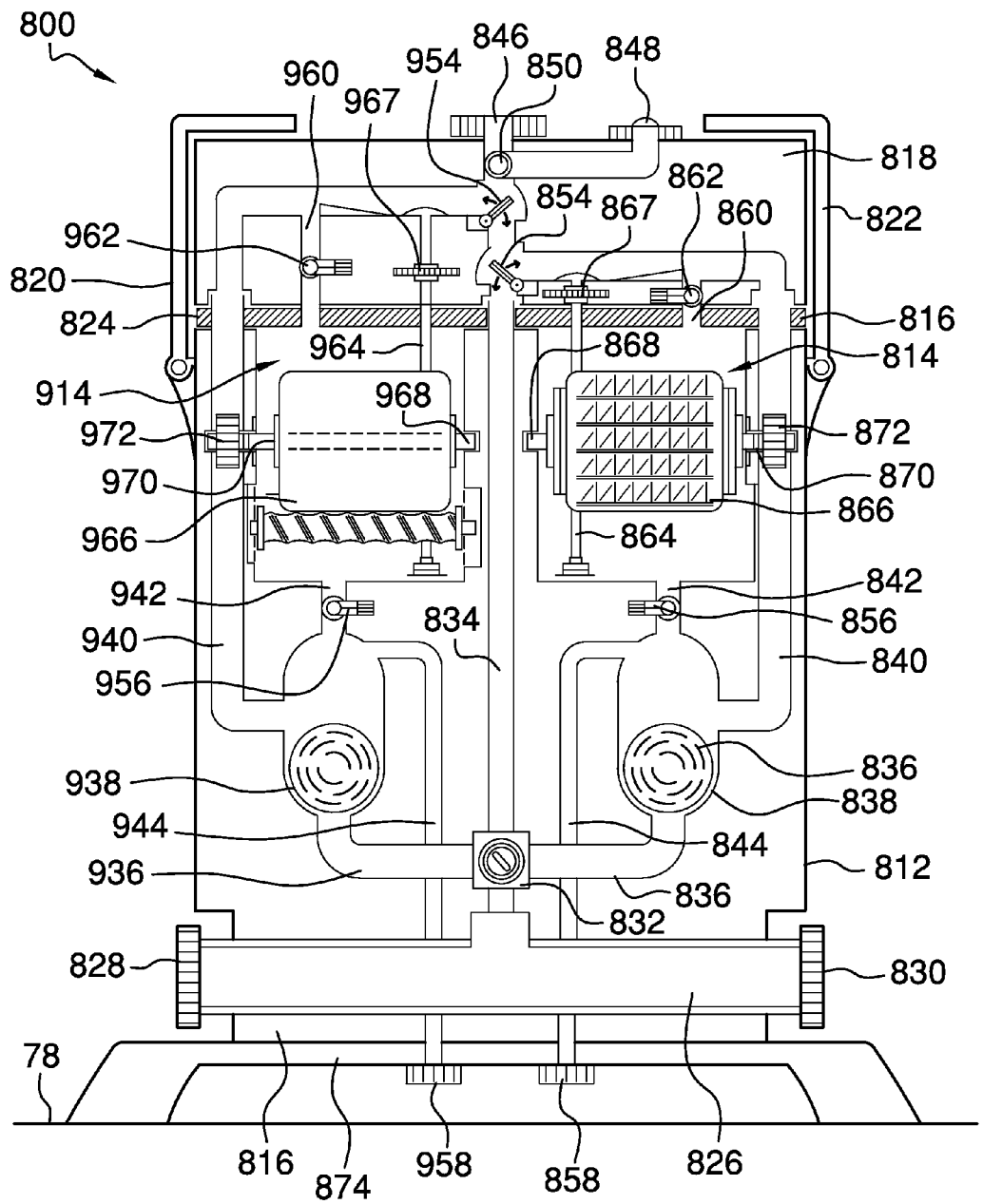
FIG. 19 is a diagrammatic illustration of yet another an alternative construction of the dispenser of FIG. 1.

FIG. 19 is a diagrammatic illustration of an alternative construction of the dispenser 10 of FIG. 1. Here, the fluid dispensing device 800 includes a housing 812 defining a first internal cavity 814 and a second internal cavity 914 extending through end 816 of the housing. A lid 818 is sealing attached to end 816 of the housing 812 and seals internal cavities 814 and 914. The lid 818 is secured to end 816 by a plurality of clamps 820 and 822 extending the exterior of the housing 812. Each clamp 820 and 822 is pivotally secured at one end to housing 812 for rotation between a first position wherein an opposite end of the clamp is cooperatively engaged with the lid 818 and a second position wherein the opposite end of the clamp is disengaged from the lid, thus permitting removal from the housing 812. As shown, in FIG. 19, the clamps 820 and 822 are in the first position, and securing the lid 818 to end 816 of the housing 812. A seal 824 is disposed between the interface of the lid 818 with end 816 to provide a sealing contact between the lid and the housing 812.

A main fluid passage 826 extends the housing 812 approximate the bottom thereof, and is fitted with couplings 828 and 830 at opposite ends. Couplings 828 and 830 permit the attachment of fluid carrying hoses to the fluid dispenser 800. Couplings 828 and 830 can be of any conventional couplings for connecting fluid carrying hoses, such as a conventional garden water hose.

A four-way valve 832 fluidically connects the main fluid passage 826 to a bypass passage 834 and a supply passage 836 and a supply passage 936. A valve 838 down stream the passage 836 fluidically connects a supply passage 840, a drain passage 842 and a drain passage 844. The supply passage 840 is fluidically connected at a first end to the valve 838 at an intermediate longitudinal position, and is fluidically connected at a second end to a first discharge port 846 and a second discharge port 848. Fluid flow through the first and second discharge ports 846 and 848 is selectively controlled by two-way valve 850. Likewise, the bypass passage 834 is fluidically connected to the first and second discharge ports 846 and 848. Fluid flowing in a direction from the main fluid passage 826 through the bypass passage 834 is prevented from flowing through the passage 840 by flap valve 854. Likewise, fluid flowing in a direction from the main fluid passage 826 through passage 840 is prevented from flowing through the bypass passage 834 by the flap valve 854.

The drain passage 842 fluidically connects the internal cavity 814 at a bottom thereof to a top end of the valve 838. A one-way valve 856 is disposed across the drain passage 842 and is operated to control the flow of fluid from the internal cavity 814 to the valve 838. The drain passage 844 fluidically connects at a top end of the valve 838 to a drain port 858. A branch passage 860 fluidically connects the passage 840 to a top end of the internal cavity 814. A one-way valve 862 is disposed across the branch passage 860 and is operated to control the flow of fluid from the passage 840 through the branch passage 860 and into the internal cavity 814.

A siphon tube or discharge tube 864 fluidically connects the internal cavity 814 to the passage 840 at a position down stream the branch passage 860 and upstream valve 850 A fluid flow rate valve 867 can be included and positioned across the discharge tube 864 to control the flow rate of fluid passing through the discharge tube from the internal cavity 814 and into the second fluid supply passage 840.

In an embodiment, a drum 866 is disposed within the internal cavity 814 and is supported therein for rotation about a longitudinal axis thereof by shaft ends 868 and 870 extending opposite ends of the drum. Shafts 868 and 870 can be supported by conventional bearings for rotation. In an aspect, shaft ends 868 and 870 can be integral with drum 866. In another aspect, shaft ends 868 and 870 are the ends of a single shaft extending the drum 866. Shaft end 870 extends into the passage 840 across the flow of fluid therethrough. A water wheel or water turbine 872 is disposed within the passage 840 and is operatively coupled to shaft end 870 for conjoint rotation therewith. Fluid flowing through the passage 840 operates the water turbine 872. Rotational energy from the turbine 872 is transmitted through shaft end 870 to the drum 866 causing the drum to rotate. As is discussed in more detail below, drum 866 can take various forms, such as a solid of chemical concentrate. In other applications, the drum 866 can comprise a perforated screen sidewall circumscribing and enclosing an internal compartment into which a solid chemical concentrate in pellet form can be loaded.

Housing 812 is fitted with a stand 874 at end 876 opposite end 816 thereof for supporting the fluid dispensing device on a ground surface 78.

Similarly, a valve 938 down stream the passage 936 fluidically connects a supply passage 940, a drain passage 942 and a drain passage 944. The supply passage 940 is fluidically connected at a first end to the valve 938 at an intermediate longitudinal position, and is fluidically connected at a second end to a first discharge port 846 and a second discharge port 848. Fluid flow through the first and second discharge ports 846 and 848 is selectively controlled by two-way valve 850. Fluid flowing in a direction from the main fluid passage 816 through the bypass passage 834 is prevented from flowing through the passage 940 at by flap valve 954. Likewise, fluid flowing in a direction from the main fluid passage 826 through passage 940 is prevented from flowing through the bypass passage 834 by the flap valve 954.

The drain passage 942 fluidically connects the internal cavity 914 at a bottom thereof to a top end of the valve 938. A one-way valve 956 is disposed across the drain passage 942 and is operated to control the flow of fluid from the internal cavity 914 to the valve 938. The drain passage 944 fluidically connects at a top end of the valve 938 to a drain port 958. A branch passage 960 fluidically connects the passage 940 to a top end of the internal cavity 914. A one-way valve 962 is disposed across the branch passage 960 and is operated to control the flow of fluid from the passage 940 through the branch passage 960 and into the internal cavity 914.

A siphon tube or discharge tube 964 fluidically connects the internal cavity 914 to the passage 940 at a position down stream the branch passage 960 and upstream valve 850 A fluid flow rate valve 967 can be included and positioned across the discharge tube 964 to control the flow rate of fluid passing through the discharge tube from the internal cavity 914 and into the second fluid supply passage 940.

In an embodiment, a drum 966 is disposed within the internal cavity 914 and is supported therein for rotation about a longitudinal axis thereof by shaft ends 968 and 970 extending opposite ends of the drum. Shafts 968 and 970 can be supported by conventional bearings for rotation. In an aspect, shaft ends 968 and 970 can be integral with drum 966. In another aspect, shaft ends 968 and 970 are the ends of a single shaft extending the drum 966. Shaft end 970 extends into the passage 940 across the flow of fluid therethrough. A water wheel or water turbine 972 is disposed within the passage 940 and is operatively coupled to shaft end 970 for conjoint rotation therewith. Fluid flowing through the passage 940 operates the water turbine 972. Rotational energy from the turbine 972 is transmitted through shaft end 970 to the drum 966 causing the drum rotate. As is discussed in more detail below, drum 966 can take various forms, such as a solid of chemical concentrate. In other applications, the drum 966 can comprise a perforated screen sidewall circumscribing and enclosing an internal compartment into which a solid chemical concentrate in pellet form can be loaded. It is important to note, either internal cavity 814 or 914 can be configured to include different types of chemical concentrates, as a not limiting example, one of the internal cavities could include a solid chemical concentrate and the other could include a liquid chemical concentrate.

Operation of fluid dispenser 800 is similar to dispenser 10 as described above, and is considered self evident in view of fluid dispenser 800 and the disclosure of fluid dispenser 10.

Figure 20A:
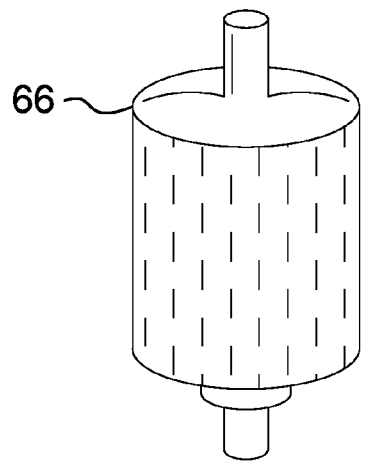
FIGS. 20A through 20E diagrammatically illustrate alternative construction to the drum.

FIG. 20A is a diagrammatic illustration of drum 66 wherein the drum is comprised of a solid chemical concentrate. Drums 866 and 966 can be similarly constructed.

Figure 20B:
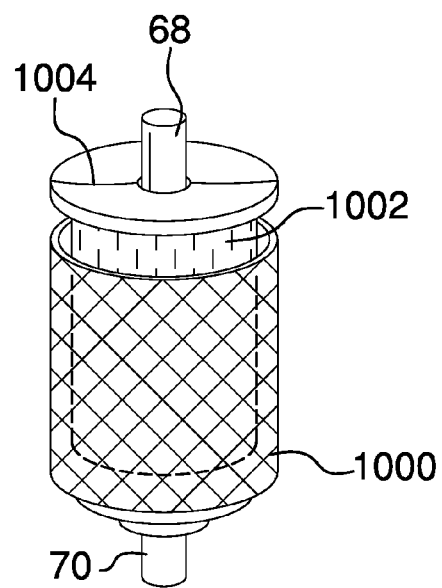

FIG. 20B is a diagrammatic illustration of drum 66 wherein the drum includes a screen basket portion 1000 connected to shaft 70 and a solid chemical concentrate 1002 extending a lid portion 1004 for sealing the open end of the basket portion 1000. Shaft end 68 is connect to lid portion 1004. Here any particulates falling from the solid chemical concentrate 1002 is contained within the basket portion, and thus preventing any of the fluid passage or valve from becoming blocked by particulate solid chemical concentrate. Drums 866 and 966 can be similarly constructed.

Figure 20C:
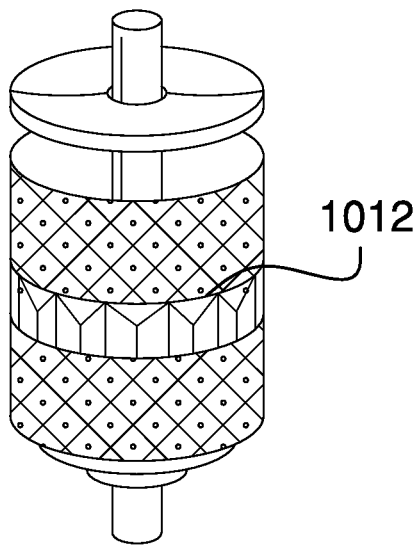

FIG. 20C—is a diagrammatic illustration of drum 66 wherein the drum includes a perforated basket portion 1012.

Figure 20D:
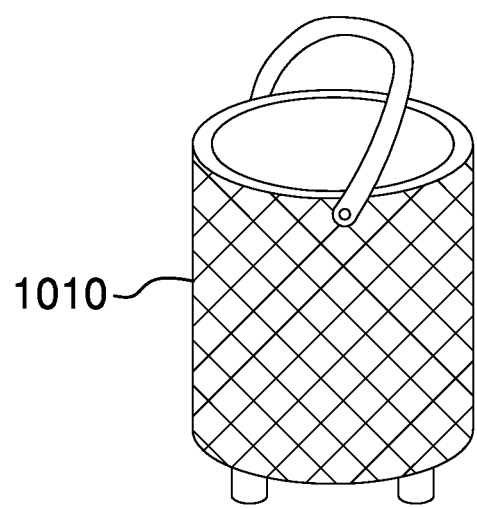

FIG. 20D is a diagrammatic illustration of a screen basket 1010 as an alternative to drum 66 and which can be inserted into the internal cavity 14. Solid chemical concentrate can be placed into the screen basket. Screen basket 1010 can also be an alternative to drums 866 and 966.

Figure 20E:
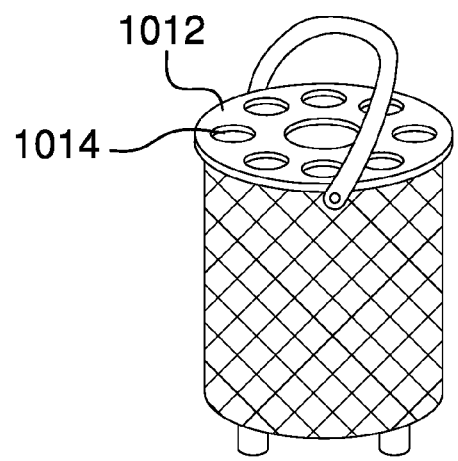

FIG. 20E is a diagrammatic illustration of an alternative to screen basket 1010, wherein a lid portion 1012 includes a plurality of through holes 1014 for receiving therein sticks of solid chemical solution. Screen basket 1010 can also be an alternative to drums 866 and 966.

Figure 21C:
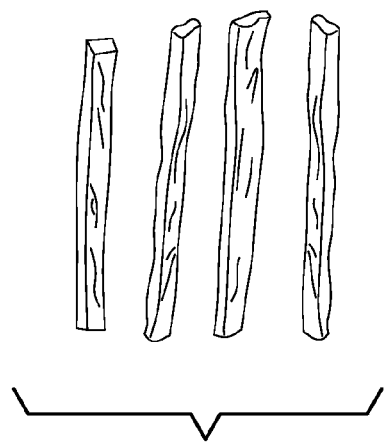
FIGS. 21A through 21D diagrammatic illustrate various forms of chemical concentrate.
Figure 21A:
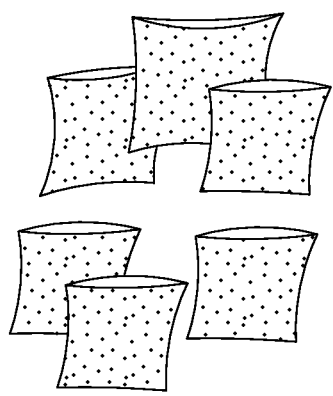

FIG. 21A is a diagrammatic illustration of a form of chemical concentrate provided in loose granular form in a screen mesh pouch.

Figure 21B:
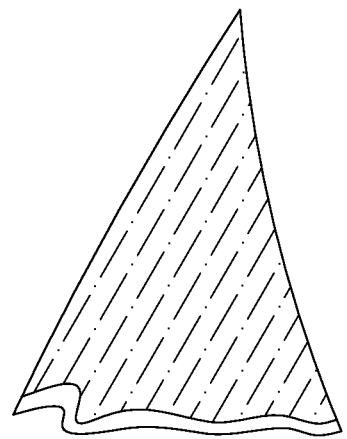

FIG. 21B is a diagrammatic illustration of a form of a chemical concentrate provided in a loose granular form.

FIG. 21C is a diagrammatic illustration of a form of a chemical concentrate provided in a solid form in the shape of a stick.

Figure 21D:
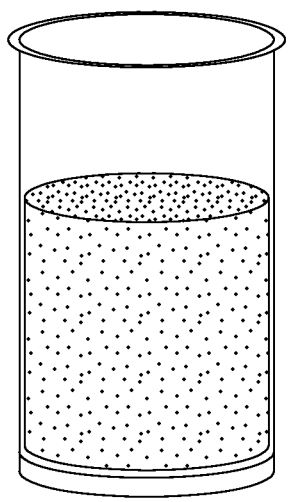

FIG. 21D is diagrammatic illustration of a form of a chemical concentrate provided in fluid form contained within a container, which can be deposited directly into the internal cavity to admix with the water flow for applications as required.

A number of embodiments of the present invention have been described. Nevertheless, it will be understood that various modifications may be made without departing from the spirit and scope of the invention.

What is claimed is:

1. A chemical dispensing apparatus for use in delivery of a treatment solution to a lawn, the apparatus comprising:
   a main fluid supply passage configured for connection to a pipe system carrying water under pressure;
   a housing including an internal cavity, an end having an opening into said internal cavity, a primary discharge port and a drain port;
   a fluid discharge passage connecting said primary discharge port;
   an internal fluid supply passage connecting said main fluid supply passage to said fluid discharge passage
   a drain passage connecting said internal cavity to said drain port;
   said internal cavity connected to said internal fluid supply passage to receive a portion of a fluid flowing through said internal fluid supply passage;
   a float valve disposed across said drain passage and across said internal fluid supply passage, said float valve including a float that is displaced by a fluid flow through said internal fluid supply passage from said main fluid supply passage from a first position where said drain passage is open and said internal fluid supply passage is sealed by said float to a second position where said internal fluid supply passage is open and said drain passage is sealed by said float, said float returning to said first position when said fluid flow is stopped;
   a container removably disposed within said internal cavity and supported for rotation therein about a horizontal axis, said container configured for the reception of a chemical concentrate;
   a water turbine disposed across said internal fluid supply passage and configured to be driven by said fluid flow through said internal fluid supply passage to provide rotational power, said water turbine operatively connected to said container to provide said rotational power thereto to rotate said container about said horizontal;
   a siphon tube connecting said internal cavity and said internal fluid supply passage, wherein said fluid flow through said internal fluid supply passage results in a vacuum on said siphon tube that causes fluid contained within said internal cavity to be drawn into said fluid flow through said internal fluid supply passage; and
   a lid removably attached to said housing, said lid sealing said opening into said internal cavity when attached to said housing.

2. The apparatus of claim 1, wherein said main fluid supply passage is configured at opposite ends thereof for inline connection to the pipe system carrying water under pressure.

3. The apparatus of claim 1, wherein said discharge fluid passage, said drain passage and said internal fluid supply passage are each defined by said housing.

4. The apparatus of claim 1, further comprising:
   a metering valve disposed across said siphon tube operable to limit the fluid flow through said siphon tube from said internal cavity.

5. The apparatus of claim 1, further comprising:
   said housing having a secondary discharge port connected to said fluid discharge passage; and
   a discharge port valve connected to said primary discharge port, said secondary discharge port and said discharge passage and operable to selectively establish a fluid flow through said primary discharge port or through said secondary discharge port.

6. The apparatus of claim 5, further comprising:
   a sprinkler head attached to said primary discharge port; and
   a misting nozzle attached to said secondary discharge port.

7. The apparatus of claim 1, further comprising:
   a drain valve connected said drain passage intermediate said float valve and said internal cavity and operable to selectively permit or preclude the flow of fluid through said drain passage.

8. The apparatus of claim 1, further comprising:
   a sprinkler head connected to said primary discharge port.

9. The apparatus of claim 1, further comprising:
   a bypass fluid passage connecting said main fluid supply passage to said fluid discharge passage; and
   a control valve connected to said main fluid supply passage, said fluid bypass passage and said internal fluid supply passage and operable to selectively permit or preclude the flow of fluid from said main fluid supply passage through said bypass passage and said internal fluid supply passage.

10. The apparatus of claim 9, further comprising:
    a flap valve disposed across a junction connecting said internal fluid supply passage, said bypass passable and said discharge passage, wherein said flap valve is operable to seal said fluid supply passage when a fluid flows through said bypass passage or seal said discharge passage when a fluid flows through said internal fluid supply passage.

11. The apparatus of claim 9, wherein said main fluid supply passage is configured at opposite ends thereof for inline connection to the pipe system carrying water under pressure.

12. The apparatus of claim 9, wherein said discharge fluid passage, said drain passage and said internal fluid supply passage are each defined by said housing.

13. The apparatus of claim 9, further comprising:
    a metering valve disposed across said siphon tube operable to limit the fluid flow through said siphon tube from said internal cavity.

14. The apparatus of claim 9, further comprising:
    said housing having a secondary discharge port connected to said fluid discharge passage; and
    a discharge port valve connected to said primary discharge port, said secondary discharge port and said discharge passage and operable to selectively establish a fluid flow through said primary discharge port or through said secondary discharge port.

15. The apparatus of claim 14, further comprising:
a sprinkler head attached to said primary discharge port; and
a misting nozzle attached to said secondary discharge port.

16. The apparatus of claim 9, further comprising:
a drain valve connected said drain passage intermediate said float valve and said internal cavity and operable to selectively permit or preclude the flow of fluid through said drain passage.

17. The apparatus of claim 9, further comprising:
a sprinkler head connected to said primary discharge port.

18. The apparatus of claim 1, further comprising:
an internal reservoir tank connected inline to said drain passage intermediate said float valve and said drain port to receive and hold a quantity of fluid flowing through said drain passage from said internal cavity;
a one-way valve connected to said drain passage at an upstream end from said internal reservoir tank;
a second drain valve connected to said drain passage at a downstream end from said internal reservoir tank; and
a second siphon tube connecting said internal reservoir tank and said internal fluid supply passage, wherein said fluid flow through said internal fluid supply passage results in a vacuum on said second siphon tube that causes fluid contained within said internal reservoir tank to be drawn into said fluid flow through said internal fluid supply passage.

19. The apparatus of claim 18, wherein said main fluid supply passage is configured at opposite ends thereof for inline connection to the pipe system carrying water under pressure.

20. The apparatus of claim 18, wherein said discharge fluid passage, said drain passage and said internal fluid supply passage are each defined by said housing.

21. The apparatus of claim 18, further comprising:
a metering valve disposed across said siphon tube operable to limit the fluid flow through said siphon tube from said internal cavity.

22. The apparatus of claim 18, further comprising:
said housing having a secondary discharge port connected to said fluid discharge passage; and
a discharge port valve connected to said primary discharge port, said secondary discharge port and said discharge passage and operable to selectively establish a fluid flow through said primary discharge port or through said secondary discharge port.

23. The apparatus of claim 22, further comprising:
a sprinkler head attached to said primary discharge port; and
a misting nozzle attached to said secondary discharge port.

24. The apparatus of claim 18, further comprising:
a drain valve connected said drain passage intermediate said float valve and said internal cavity and operable to selectively permit or preclude the flow of fluid through said drain passage.

25. The apparatus of claim 18, further comprising:
a sprinkler head connected to said primary discharge port.

26. The apparatus of claim 18, further comprising:
a bypass fluid passage connecting said main fluid supply passage to said fluid discharge passage; and
a control valve connected to said main fluid supply passage, said fluid bypass passage and said internal fluid supply passage and operable to selectively permit or preclude the flow of fluid from said main fluid supply passage through said bypass passage and said internal fluid supply passage.

27. The apparatus of claim 26, further comprising:
a flap valve disposed across a junction connecting said internal fluid supply passage, said bypass passable and said discharge passage, wherein said flap valve is operable to seal said fluid supply passage when a fluid flows through said bypass passage or seal said discharge passage when a fluid flows through said internal fluid supply passage.

28. The apparatus of claim 26, wherein said main fluid supply passage is configured at opposite ends thereof for inline connection to the pipe system carrying water under pressure.

29. The apparatus of claim 26, wherein said discharge fluid passage, said drain passage and said internal fluid supply passage are each defined by said housing.

30. The apparatus of claim 26, further comprising:
a metering valve disposed across said siphon tube operable to limit the fluid flow through said siphon tube from said internal cavity.

31. The apparatus of claim 26, further comprising:
said housing having a secondary discharge port connected to said fluid discharge passage; and
a discharge port valve connected to said primary discharge port, said secondary discharge port and said discharge passage and operable to selectively establish a fluid flow through said primary discharge port or through said secondary discharge port.

32. The apparatus of claim 31, further comprising:
a sprinkler head attached to said primary discharge port; and
a misting nozzle attached to said secondary discharge port.

33. The apparatus of claim 26, further comprising:
a drain valve connected said drain passage intermediate said float valve and said internal cavity and operable to selectively permit or preclude the flow of fluid through said drain passage.

34. The apparatus of claim 26, further comprising:
a sprinkler head connected to said primary discharge port.

* * * * *